(12) United States Patent
Hosseini et al.

(10) Patent No.: US 11,184,106 B2
(45) Date of Patent: Nov. 23, 2021

(54) MODULATION TABLE DETERMINATION AND CHANNEL QUALITY INDICATOR REPORTING

(71) Applicant: QUALCOMM Incorporated, San Diego, CA (US)

(72) Inventors: Seyedkianoush Hosseini, San Diego, CA (US); Wanshi Chen, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 16/264,626

(22) Filed: Jan. 31, 2019

(65) Prior Publication Data

US 2019/0238257 A1    Aug. 1, 2019

Related U.S. Application Data

(60) Provisional application No. 62/625,300, filed on Feb. 1, 2018.

(51) Int. Cl.
*H04W 72/04* (2009.01)
*H04L 1/00* (2006.01)
(Continued)

(52) U.S. Cl.
CPC ............ *H04L 1/0004* (2013.01); *H04L 1/001* (2013.01); *H04L 1/0016* (2013.01);
(Continued)

(58) Field of Classification Search
None
See application file for complete search history.

(56) References Cited

U.S. PATENT DOCUMENTS

| | | | |
|---|---|---|---|
| 10,985,966 B2* | 4/2021 | Horiuchi | H04L 29/06 |
| 2014/0169297 A1* | 6/2014 | Kim | H04L 1/0016 |
| | | | 370/329 |

(Continued)

FOREIGN PATENT DOCUMENTS

WO    WO-2017171956 A1    10/2017

OTHER PUBLICATIONS

Huawei et al., "Support of 1024QAM in TS 36.331 ",3GPP Draft; R2-1712898 Support of 1024QAM in TS 36.331,3rd Generation Partnership Project (3GPP), Mobile Competence Centre ; 650, Route Des Lucioles ; F-06921 Sophia-Antipolis Cedex; France vol. RAN WG2, No. Reno, USA; 20171127-20171201, Nov. 17, 2017 (Nov. 17, 2017), XP051371774, 57 Pages,Retrieved from the Internet: URL:http://www.3gpp.org/ftp/tsg%5Fran/WG2%5FRL2/TSGR2%5F100/Docs/ [retrieved on Nov. 17, 2017], pp. 1.6.42.

(Continued)

*Primary Examiner* — Sithu Ko
(74) *Attorney, Agent, or Firm* — Holland & Hart LLP

(57) ABSTRACT

Methods, systems, and devices for wireless communications are described. One method may include a user equipment (UE) determining a capability of the UE for at least one modulation order associated with a first transmission time interval (TTI) and a second TTI that is shorter than the first TTI, transmitting a UE capability message based on determining the UE capability, receiving a message including a parameter and a modulation coding scheme (MCS) index based on the UE capability message, and selecting a modulation table for communicating, to a base station, a transmission associated with the first TTI and the second TTI.

30 Claims, 16 Drawing Sheets

(51) Int. Cl.
    *H04W 8/22*     (2009.01)
    *H04L 1/18*     (2006.01)
    *H04L 5/00*     (2006.01)
    *H04W 8/24*     (2009.01)

(52) U.S. Cl.
    CPC ............ *H04L 1/0031* (2013.01); *H04W 8/22* (2013.01); *H04L 1/18* (2013.01); *H04L 5/00* (2013.01); *H04W 8/24* (2013.01)

(56) References Cited

U.S. PATENT DOCUMENTS

| | | | |
|---|---|---|---|
| 2014/0192732 A1* | 7/2014 | Chen | H04L 1/0003 370/329 |
| 2015/0237644 A1* | 8/2015 | Golitschek Edler von Elbwart | H04W 72/042 370/329 |
| 2017/0207878 A1* | 7/2017 | Chen | H04L 43/16 |
| 2017/0290008 A1* | 10/2017 | Tooher | H04L 1/1893 |
| 2018/0097600 A1* | 4/2018 | Bagheri | H04L 5/0057 |
| 2018/0359745 A1* | 12/2018 | Yeo | H04W 72/14 |
| 2018/0368134 A1* | 12/2018 | Zhang | H04W 72/1215 |
| 2019/0223204 A1* | 7/2019 | Kim | H04W 72/14 |
| 2019/0239066 A1* | 8/2019 | Yi | H04L 1/1896 |

OTHER PUBLICATIONS

International Search Report and Written Opinion—PCT/US2019/016429—ISA/EPO—dated May 13, 2019.

Panasonic: "System Performance with Low Capability UE (2ms TTI vs 10ms TTI)", 3GPP Draft; R1-041206, 3rd Generation Partnership Project (3GPP), Mobile Competence Centre ; 650, Route Des Lucioles ; F-06921 Sophia-Antipolis Cedex; France,vol. RAN WG1, No. Seoul, Korea; 20040916, Sep. 16, 2004(Sep. 16, 2004), XP050099401,5 p. [retrieved on Sep. 16, 2004], Section 1 "introduction" and section 2 "UE Types", pp. 1-2.

Qualcomm Incorporated: "Higher Order Modulation",3GPP Draft; R1-140451 Higher Order Modulation, 3rd Generation Partnership Project (3GPP), Mobile Competence Centre ; 650, Route Des Lucioles ; F-06921 Sophia-Antipolis Cedex; France vol. RAN WG1, No. Prague, Czech Republic; 20140210-20140214, Feb. 9, 2014 (Feb. 9, 2014), XP050735987, 6 Pages,Retrieved from the Internet:URL:http://www.3gpp.org/ftp/Meetings_3GPP_SYNC/RAN/RAN1/Docs/[retrieved on Feb. 9, 2014], Section 2.3 "MCS/TBS Table", section 2.4"CoMP Aspects" and section 2.5 "UE Capability/Category". pp. 3-6.

* cited by examiner

MODULATION TABLE DETERMINATION AND CHANNEL QUALITY INDICATOR REPORTING

CROSS REFERENCES

The present Application for Patent claims the benefit of U.S. Provisional Patent Application No. 62/625,300 by Hosseini, et al., entitled "Modulation Table Determination and Channel Quality Indicator Reporting," filed Feb. 1, 2018, assigned to the assignee hereof, and expressly incorporated herein.

BACKGROUND

The following relates generally to wireless communication, and more specifically to modulation table determination and channel quality indicator (CQI) reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may communicate with a UE to allocate resources for transmission during a transmission time interval (TTI). A portion of the resources (e.g., time and frequency resources) may be designated for transmission of this information (e.g. resource allocation) during the TTI. The base station may also use different communication channels to provide information to the UE. For example, the base station may use a control channel to transmit control information to the UE, and a data channel to transmit data to the UE. In some cases, the TTI may be a shortened TTI (sTTI). Improving the efficiency of transmission for one or more sTTIs may provide reliability for a wireless communications system.

SUMMARY

The described techniques relate to improved methods, systems, devices, or apparatuses that support modulation table determination and channel quality indicator (CQI) reporting. Generally, the described techniques provide for modulation table determination for shortened physical downlink control channel (sPDCCH), shortened physical uplink shared channel (sPUSCH), and sTTI CQI reporting. A UE may determine a capability of the UE for at least one modulation order associated with one or more TTIs, which may include one or more TTIs, one or more sTTIs, or both. The UE may transmit a UE capability message to a base station. In some cases, the UE may provide one or more capabilities associated with the one or more TTIs, including any sTTIs, in a single UE capability message.

Alternatively, the UE may transmit separate UE capability messages for a TTI and an sTTI, respectively. In some cases, the capability may indicate an order of modulation or an associated modulation scheme (which may in turn be part of a modulation and coding scheme (MCS)) supported by the UE for one or each of the one or more TTIs and/or the one or more sTTIs. The base station may receive the UE capability message and configure a parameter that may be a higher layer parameter. The parameter may indicate an applicability of a CQI table among multiple potential CQI tables that the UE may use to provide CQI information (e.g., feedback) to the base station. The base station may transmit a message including the parameter and an MCS index to the UE. In some cases, the parameter may be configured for each cell and for a subset or all subframes. The UE may receive and select a modulation table for communicating a transmission associated with the one or more TTIs (which may include one or more sTTIs), and provide CQI feedback to the base station by selecting a CQI table based on the configured parameter.

A method for wireless communication by a UE. The method may include determining a capability of the UE for at least one modulation order associated with a first TTI and a second TTI that is shorter than the first TTI; transmitting a UE capability message based at least in part on determining the UE capability; receiving a message comprising a parameter and a MCS index based at least in part on the UE capability message; and selecting a modulation table for communicating, to a base station, a transmission associated with the first TTI and the second TTI based at least in part on receiving the message.

An apparatus for wireless communication is described. The apparatus may include means for determining a capability of the apparatus for at least one modulation order associated with a first TTI and a second TTI that is shorter than the first TTI; means for transmitting a UE capability message based at least in part on determining the UE capability; means for receiving a message comprising a parameter and a MCS index based at least in part on the UE capability message; and means for selecting a modulation table for communicating, to a base station, a transmission associated with the first TTI and the second TTI based at least in part on receiving the message.

Another apparatus for wireless communication is described. The apparatus may include a processor, memory in electronic communication with the processor, and instructions stored in the memory. The instructions may be operable to cause the processor to determine a capability of the apparatus for at least one modulation order associated with a first TTI and a second TTI that is shorter than the first TTI; transmit a UE capability message based at least in part on determining the UE capability; receive a message comprising a parameter and a MCS index based at least in part on the UE capability message; and select a modulation table for communicating, to a base station, a transmission associated with the first TTI and the second TTI based at least in part on receiving the message.

A non-transitory computer-readable medium for wireless communication at a UE is described. The non-transitory computer-readable medium may include instructions operable to cause a processor to determine a capability of the UE for at least one modulation order associated with a first TTI and a second TTI that is shorter than the first TTI; transmit a UE capability message based at least in part on determining the UE capability; receive a message comprising a parameter and a MCS index based at least in part on the UE capability message; and select a modulation table for communicating, to a base station, a transmission associated with the first TTI and the second TTI based at least in part on receiving the message.

Some examples of the method, apparatus, and non-transitory computer-readable medium described above may further include processes, features, means, or instructions for determining whether the parameter is enabled or disabled, wherein selecting the modulation table is based at least in part on determining whether the parameter is enabled.

Some examples of the method, apparatus, and non-transitory computer-readable medium described above may further include processes, features, means, or instructions for receiving the message via a sPDCCH. In some examples of the method, apparatus, and non-transitory computer-readable medium described above, the message further comprises an allocation of resources, or configuration information for one or more physical channels, or CQI reporting, or any combination thereof.

In some examples of the method, apparatus, and non-transitory computer-readable medium described above, the configuration information comprises a transmission configuration for the first TTI and the second TTI, and the CQI reporting is based at least in part on the configuration information.

Some examples of the method, apparatus, and non-transitory computer-readable medium described above may further include processes, features, means, or instructions for determining a downlink control information (DCI) format associated with the sPDCCH; and determining that a cyclic redundancy check (CRC) associated with the sPDCCH is scrambled with a cell radio network temporary identifier (C-RNTI) of the UE.

Some examples of the method, apparatus, and non-transitory computer-readable medium described above may further include processes, features, means, or instructions for determining that the DCI format is an acceptable DCI format from a list of DCI formats based at least in part on determining that the parameter is enabled; determining that the CRC is scrambled with the C-RNTI of the UE; and determining a modulation order in the modulation table based at least in part on the MCS index. In some examples of the method, apparatus, and non-transitory computer-readable medium described above, selecting the modulation table is based at least in part on determining that the parameter is enabled, or the DCI format is the acceptable DCI format, or that the CRC is scrambled with the C-RNTI, or any combination thereof.

Some examples of the method, apparatus, and non-transitory computer-readable medium described above may further include processes, features, means, or instructions for determining a modulation order in the selected modulation table based at least in part on the MCS index. In some examples of the method, apparatus, and non-transitory computer-readable medium described above, selecting the modulation table is based at least in part on determining that the parameter is disabled.

In some examples of the method, apparatus, and non-transitory computer-readable medium described above, the second TTI is a sTTI.

Some examples of the method, apparatus, and non-transitory computer-readable medium described above may further include processes, features, means, or instructions for transmitting a second UE capability information message separate from the UE capability message indicating capability of the UE for the second TTI.

In some examples of the method, apparatus, and non-transitory computer-readable medium described above, the UE capability message comprises UE capability for both the first TTI and the second TTI.

In some examples of the method, apparatus, and non-transitory computer-readable medium described above, the second TTI comprises a plurality of sTTIs.

In some examples of the method, apparatus, and non-transitory computer-readable medium described above, the UE capability message is associated with the plurality of sTTIs.

Some examples of the method, apparatus, and non-transitory computer-readable medium described above may further include processes, features, means, or instructions for transmitting a UE capability message for at least some sTTIs of the plurality of sTTIs. In some examples of the method, apparatus, and non-transitory computer-readable medium described above, the parameter and the MCS index is associated with the plurality of sTTIs or each sTTI is associated with a separate parameter and MCS index.

In some examples of the method, apparatus, and non-transitory computer-readable medium described above, at least a subset of the sTTIs comprise variable lengths.

In some examples of the method, apparatus, and non-transitory computer-readable medium described above, the UE is configured with a default modulation table for the transmission associated with the first TTI and the second TTI.

Some examples of the method, apparatus, and non-transitory computer-readable medium described above may further include processes, features, means, or instructions for receiving a DCI comprising an information element (IE) field for a modulation table indicator; and identifying the modulation table based at least in part on a bit value of the IE field. In some examples of the method, apparatus, and non-transitory computer-readable medium described above, selecting the modulation table is based at least in part on the identifying.

Some examples of the method, apparatus, and non-transitory computer-readable medium described above may further include processes, features, means, or instructions for monitoring a downlink control channel for a message comprising a C-RNTI associated with the UE. In some examples of the method, apparatus, and non-transitory computer-readable medium described above, selecting the modulation table is further based at least in part on the message comprising the C-RNTI.

Some examples of the method, apparatus, and non-transitory computer-readable medium described above may further include processes, features, means, or instructions for determining a modulation order in the selected modulation table based at least in part on the MCS index; and selecting a CQI table based at least in part on a CQI reporting configuration.

In some examples of the method, apparatus, and non-transitory computer-readable medium described above, the CQI reporting configuration associated with CQI reporting indicates that the CQI table applies to the first TTI or the second TTI, or both.

In some examples of the method, apparatus, and non-transitory computer-readable medium described above, the parameter comprises an indication of UE capability for a 64QAM, a 256QAM, or a 1024QAM.

In some examples of the method, apparatus, and non-transitory computer-readable medium described above, the transmission is a downlink transmission or an uplink transmission.

Some examples of the method, apparatus, and non-transitory computer-readable medium described above may further include processes, features, means, or instructions for selecting the modulation table for the uplink transmission based at least in part on the received MCS index; and determining a modulation order in the selected modulation table for the uplink transmission based at least in part on the MCS index and a DCI format associated with the received message.

Some examples of the method, apparatus, and non-transitory computer-readable medium described above may further include processes, features, means, or instructions for determining the modulation order for the uplink transmission based at least in part on semi-persistent scheduling or a random access response grant.

In some examples of the method, apparatus, and non-transitory computer-readable medium described above, the parameter is a higher layer parameter.

Some examples of the method, apparatus, and non-transitory computer-readable medium described above may further include processes, features, means, or instructions for transmitting a second UE capability message separate from the UE capability message. In some examples of the method, apparatus, and non-transitory computer-readable medium described above, the UE capability message is for uplink and the second UE capability message is for downlink.

A method for wireless communication by a base station. The method may include receiving a UE capability message for at least one modulation order associated with a first TTI and a second TTI that is shorter than the first TTI; configuring a parameter associated with a modulation table based at least in part on the UE capability message; determining a MCS index based at least in part on the UE capability message; and transmitting a message comprising the parameter and the MCS index.

An apparatus for wireless communication is described. The apparatus may include means for receiving a UE capability message for at least one modulation order associated with a first TTI and a second TTI that is shorter than the first TTI; means for configuring a parameter associated with a modulation table based at least in part on the UE capability message; means for determining a MCS index based at least in part on the UE capability message; and means for transmitting a message comprising the parameter and the MCS index.

Another apparatus for wireless communication is described. The apparatus may include a processor, memory in electronic communication with the processor, and instructions stored in the memory. The instructions may be operable to cause the processor to receive a UE capability message for at least one modulation order associated with a first TTI and a second TTI that is shorter than the first TTI; configure a parameter associated with a modulation table based at least in part on the UE capability message; determine a MCS index based at least in part on the UE capability message; and transmit a message comprising the parameter and the MCS index.

A non-transitory computer-readable medium for wireless communication at a base station is described. The non-transitory computer-readable medium may include instructions operable to cause a processor to receive a UE capability message for at least one modulation order associated with a first TTI and a second TTI that is shorter than the first TTI; configure a parameter associated with a modulation table based at least in part on the UE capability message; determine a MCS index based at least in part on the UE capability message; and transmit a message comprising the parameter and the MCS index.

Some examples of the method, apparatus, and non-transitory computer-readable medium described above may further include processes, features, means, or instructions for enabling the parameter based at least in part on the UE capability message, wherein configuring the parameter comprises the enabling.

Some examples of the method, apparatus, and non-transitory computer-readable medium described above may further include processes, features, means, or instructions for disabling the parameter based at least in part on the UE capability message, wherein configuring the parameter comprises the disabling.

Some examples of the method, apparatus, and non-transitory computer-readable medium described above may further include processes, features, means, or instructions for transmitting the message via a sPDCCH, wherein the message further comprises an allocation of resources, or configuration information for one or more physical channels, or CQI reporting, or any combination thereof.

In some examples of the method, apparatus, and non-transitory computer-readable medium described above, the configuration information comprises a transmission configuration for the first TTI and a second TTI, and the CQI reporting is based at least in part on the configuration information.

In some examples of the method, apparatus, and non-transitory computer-readable medium described above, the second TTI is an sTTI.

Some examples of the method, apparatus, and non-transitory computer-readable medium described above may further include processes, features, means, or instructions for receiving a second UE capability information message separate from the UE capability message indicating capability for the second TTI.

In some examples of the method, apparatus, and non-transitory computer-readable medium described above, the UE capability message comprises UE capability for both the first TTI and the second TTI.

In some examples of the method, apparatus, and non-transitory computer-readable medium described above, the second TTI comprises a plurality of sTTIs.

In some examples of the method, apparatus, and non-transitory computer-readable medium described above, the UE capability message is associated with the plurality of sTTIs.

Some examples of the method, apparatus, and non-transitory computer-readable medium described above may further include processes, features, means, or instructions for receiving a second UE capability message separate from the UE capability message. In some examples of the method, apparatus, and non-transitory computer-readable medium described above, the UE capability message is for uplink and the second UE capability message is for downlink.

DETAILED DESCRIPTION

Figure 1:
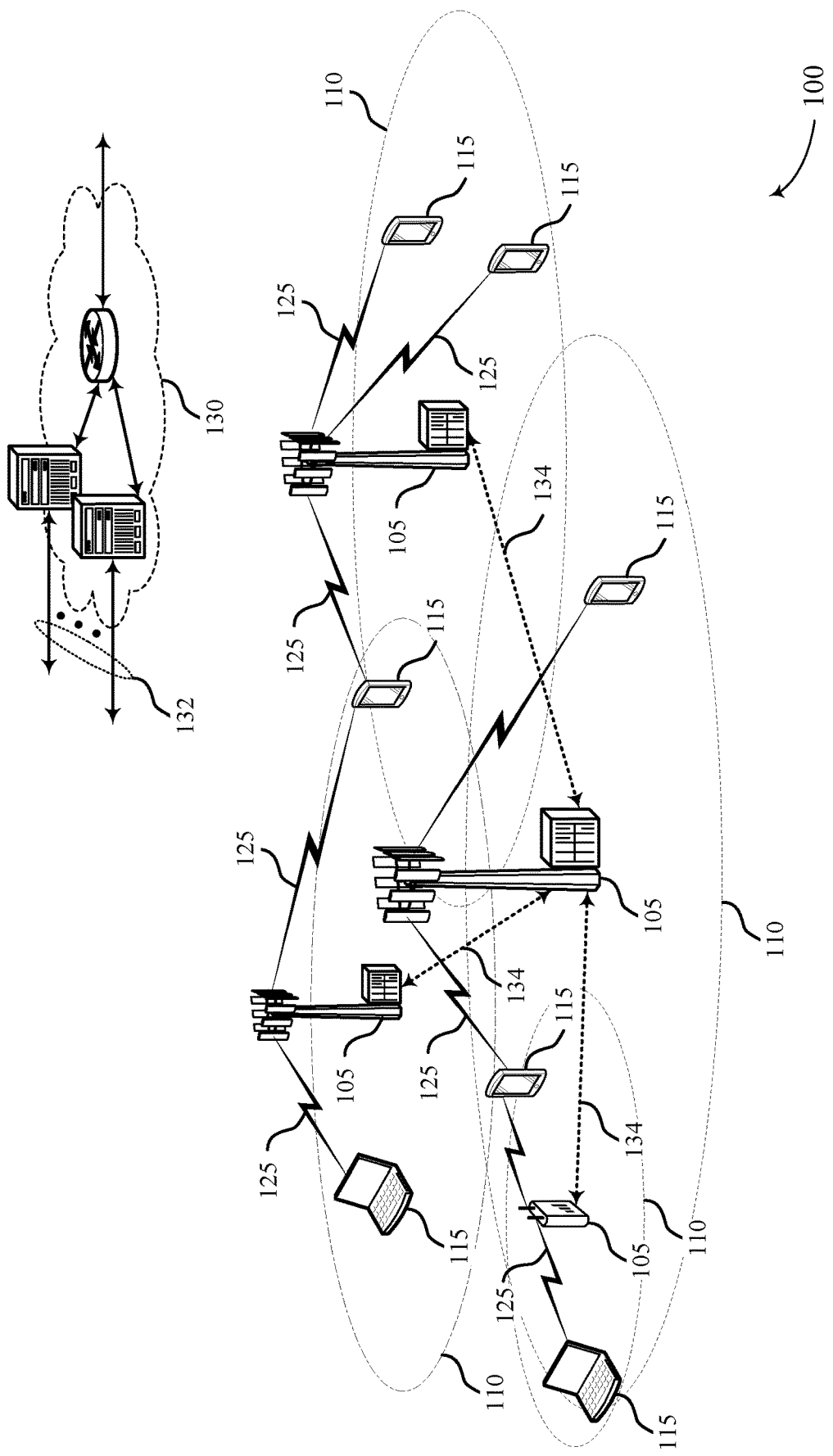
FIGS. 1 and 2 illustrates an example of a wireless communications system that supports modulation table determination and channel quality indicator (CQI) reporting in accordance with aspects of the present disclosure.

A user equipment (UE) may determine a capability of the UE for at least one modulation order associated with one or more TTIs. The modulation order may be associated with a modulation coding scheme (MCS), and thus may be associated with modulation scheme such as a 64QAM, a 256QAM, or a 1024QAM, among other possibilities. In some cases, some of the TTIs may be sTTIs. For example, a first TTI may have a 1 ms duration, while a second TTI may be an sTTI that has a duration less than 1 ms (e.g., 0.5 ms). Because of characteristics and operations related to the sTTIs, other systems and operations related to modulation order and transport block size (TB S) index determination may be insufficient or may not account for variations and differences based on sTTIs. There is a need for devices to configure various communication aspects such as modulation order and TBS index determinations to facilitate communications between a first device (e.g., a UE) and a second device (e.g., a base station) based on TTIs, sTTIs, or both. Moreover, there is a need for devices to be able to determine aspects related to different modulation orders (e.g., higher modulation orders such as 1024QAM), such as which TBS table or other parameters should be used.

The UE may transmit a UE capability message to a base station. In some examples, the UE may transmit different UE capability messages for uplink and downlink. In some cases, the UE may provide one or more capabilities associated with the one or more TTIs, including any sTTIs, in a single UE capability message. Alternatively, the UE may transmit separate UE capability messages for a TTI and an sTTI. In the example of a first TTI and a second TTI being an sTTI, the UE may indicate UE capability associated with the first TTI in a first UE capability message and UE capability associated with the second TTI in a second UE capability message. Additionally, in the case that the UE is scheduled for one or more transmissions during a number of sTTIs, the UE may provide separate indications of UE capability for each of the sTTI. In some cases, the capability may indicate an MCS supported by the UE for one or each of the TTI and/or sTTI. Each TTI and sTTI may be associated with downlink communications or uplink communications, or both.

The base station may receive the UE capability message and configure a parameter that may be a higher layer parameter (e.g., altCQI-Table-STTI-r15). (Throughout this application, though in some cases specific parameter names may be utilized, it is to be understood that the name of any one or more parameters may differ in a given implementation without deviating from the teachings herein.) The parameter may indicate an applicability of a CQI table that the UE may use to provide CQI feedback to the base station. In addition, the parameter may include the applicability of the CQI table for both aperiodic and periodic CSI reporting. The base station may transmit a message including the parameter and an MCS index to the UE. The UE may receive and select a modulation table for communicating a transmission associated with the one or more TTIs. Additionally, the UE may provide CQI feedback to the base station by selecting a CQI table based on the configured parameter.

Aspects of the disclosure are initially described in the context of a wireless communications system. Aspects of the disclosure are further illustrated by a process flow. Aspects of the disclosure are further illustrated by and described with reference to apparatus diagrams, system diagrams, and flowcharts that relate to modulation table determination and CQI reporting.

FIG. 1 illustrates an example of a wireless communications system 100 that supports modulation table determination and CQI reporting in accordance with various aspects of the present disclosure. The system 100 includes base stations 105, UEs 115, and a core network 130. In some examples, the system 100 may be a Long Term Evolution (LTE) network, an LTE-Advanced (LTE-A) network, an LTE-A Pro network, or a New Radio (NR) network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110.

In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW).

The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The system 100 may also operate in a super high frequency (SHF) region using frequency bands from 3 GHz to 30 GHz, also known as the centimeter band. The SHF region includes bands such as the 5 GHz multiple industrial, scientific, and medical (ISM) bands, which may be used opportunistically by devices that can tolerate interference from other users. The system 100 may also operate in an extremely high frequency (EHF) region of the spectrum (e.g., from 30 GHz to 300 GHz), also known as the millimeter band. In some examples, the system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115.

However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the system 100 may use a transmission scheme between a transmitting device (e.g., a base station 105) and a receiving device (e.g., a UE 115), where the transmitting device is equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device.

Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission.

Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions.

For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms.

A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the system 100, and may be referred to as a TTI. In other cases, a smallest scheduling unit of the system 100 may be shorter than a subframe or may be dynamically selected (e.g., in bursts of sTTIs or in selected component carriers using sTTIs).

A UE 115 may determine a capability for at least one modulation order associated with a first TTI and a second TTI that is shorter than the first TTI. The second TTI may be an sTTI. The UE 115 may transmit to a base station 105 a UE capability message based on determining the UE 115 capability. In some cases, the UE capability message may include UE 115 capability for both the first TTI and the second TTI. The base station 105 may receive the UE capability message and configure a parameter associated with a modulation table based on the UE capability message. The base station 105 may also determine an MCS index based on the UE capability message. In some cases, the parameter may be configured for each cell (e.g., different base stations 105) and for a subset or all subframes associated with a transmission (e.g., downlink and/or uplink transmission).

Upon configuring the parameter and determining the MCS index, the base station 105 may transmit a message including the parameter and the MCS index to the UE 115. The UE 115 may receive the message, and select a modulation table for communicating a transmission associated with the first TTI and the second TTI. The UE 115 may receive the message via an sPDCCH. The message may include an allocation of resources, or configuration information for one or more physical channels, or CQI reporting, or any combination thereof. The configuration information may include a transmission configuration for the first TTI and the second TTI, and the CQI reporting may be based in part on the configuration information.

The UE 115 may determine whether the parameter is enabled or disabled. In some cases, selecting the modulation table may be based in part on determining whether the parameter is enabled. The UE 115 may also determine a DCI format associated with the sPDCCH, and determine that a CRC associated with the sPDCCH is scrambled with a C-RNTI of the UE 115. In some cases, the UE 115 may determine that the DCI format is an acceptable DCI format from a list of DCI formats based in part on determining that the parameter is enabled, and determine that the CRC is scrambled with the C-RNTI of the UE, and determine a modulation order in the modulation table based in part on the MCS index. In some cases, selecting the modulation table may be based in part on determining that the parameter is enabled, or the DCI format is the acceptable DCI format, or that the CRC is scrambled with the C-RNTI, or any combination thereof. The UE 115 may determine a modulation order in the selected modulation table based in part on the MCS index.

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth. The system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, the system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power). In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
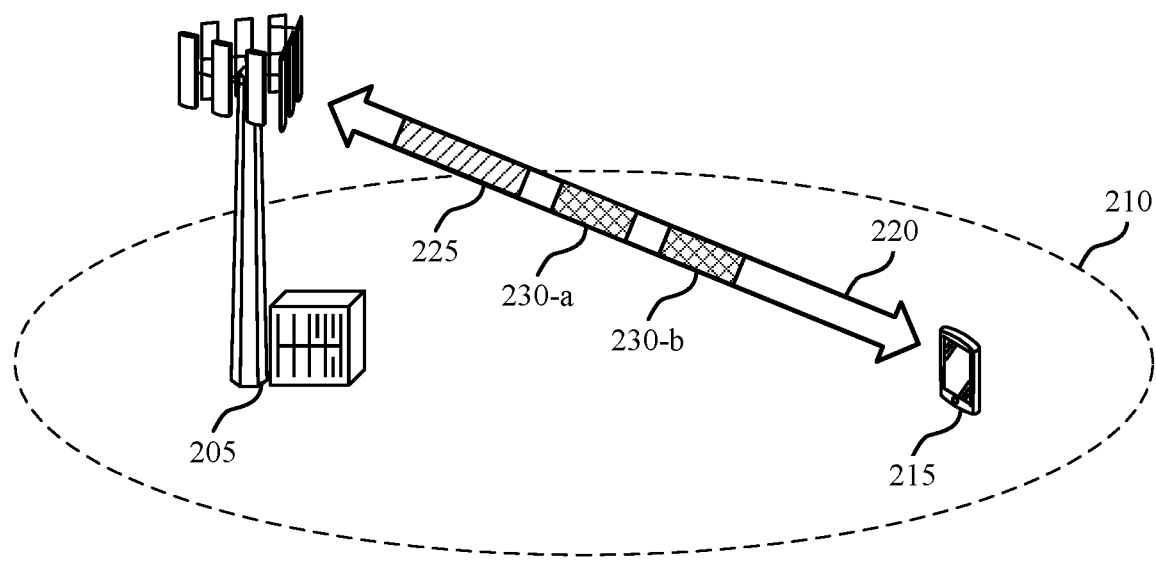

FIG. 2 illustrates an example of a wireless communications system 200 that supports modulation table determination and CQI reporting in accordance with various aspects of the present disclosure. In some examples, the wireless communications system 200 may implement aspects of the wireless communications system 100. The wireless communications system 200 may include a base station 205 and a UE 215, which may be examples of the corresponding devices described with reference to FIG. 1. In the example of FIG. 2, the wireless communications system 200 may operate according to a radio access technology (RAT) such as a fourth generation (4G) LTE or LTE-A, although techniques described herein may be applied to any RAT and to wireless communications systems that may concurrently use two or more different RATs, for example, 4G LTE, LTE-A, and 5G NR.

The base station 205 may establish a connection (e.g., a bidirectional link 220) with the UE 215 within a coverage area 210. The base station 205 and the UE 215 may communicate one or more frames using the bidirectional link 220. Each frame may include ten 1 ms subframes numbered from 0 to 9 (e.g., SF$_0$ through SF$_9$). A subframe may be further divided into two 0.5 ms slots, each of which may contain 6 or 7 modulation symbol periods. In some cases, the subframe may be the smallest scheduling unit, also known as a TTI. In other cases, a TTI may be shorter than a subframe and may be referred to as an sTTI. For example, the base station 205 may communicate information (e.g., control information and data) during a TTI 225 or sTTI 230, or both.

In some examples, the base station 205 and the UE 215 may establish the bidirectional link 220 by performing a connection procedure (e.g., a cell acquisition procedure, a random access channel (RACH) procedure, an RRC connection procedure, an RRC configuration procedure). In some cases, during the connection procedure the base station 205 may allocate resources (e.g., time and frequency resources) for the UE 215. The resources may include a number of resource elements that span one modulation symbol period by one sub-carrier. Each resource element may carry two, four, or six physical channel bits depending on a modulation scheme (e.g., 16QAM, 64QAM). Additionally or alternatively, a higher order modulation scheme such as 1024QAM may be supported by the base station 205 and the UE 215. The base station 205 may group resource elements into resource blocks (RBs), each RB may span 0.5 ms (i.e., one slot) by 180 kHz (i.e., 12 sub-carriers). The base station 205 may use the RBs for frequency-dependent scheduling, by allocating modulation symbol periods and sub-carriers within each subframe in units of RBs.

The base station 205 may transmit a message including control information to the UE 215 via bidirectional link 220. In an example, the message may be an RRC message, which the base station 205 may communicate to the UE 215 via RRC signaling. In another example, the base station 205 may transmit the control information in a DCI on a physical downlink control channel (PDCCH) or a sPDCCH. For example, for the TTI 225 the base station 205 may communicate a DCI on a PDCCH, while for the sTTI 230-a or sTTI 230-b the base station 205 may communicate an sDCI on an sPDCCH. The base station 205 may use different formats to communicate different control information to the UE 215. For example, a DCI format may include a DCI format 1, a DCI format 1B, a DCI format 1D, a DCI format 2, a DCI format 2A, a DCI format 2B, a DCI format 2C, and a DCI format 2D. An sDCI format may include an sDCI format 7-1B, an sDCI format 7-1C, an sDCI format 7-1D, an sDCI format 7-1E, an sDCI format 7-1F, and an sDCI format 7-1G. In some cases, the base station 205 may configure one or more sDCI formats for sTTI 230, or modify preconfigured sDCI formats.

The message may be transmitted to the UE 215 during a portion of the TTI 225 or at least one of the sTTIs 230, for example, during a control region. The control information in the message may indicate to the UE 215 forthcoming data transmission and information on how the data will be transmitted to the UE 215, for example, configuration parameters such as an amount of data, allocated resources, CQI reporting configuration, and an MCS index. The base station 205 may transmit the message including the control information using a higher order modulation (e.g., 64QAM, 256QAM). A modulation scheme used by the base station 205 and the UE 215 may be static or dynamic. For example, the modulation scheme may vary across different sTTIs and/or TTIs based on channel conditions, etc.

The base station 205 may, in some cases, assign a unique C-RNTI to the UE 215. Prior to transmitting control information to the UE 215, the base station 205 may attach a CRC to the control information. For example, the base station 205 may append a CRC to an sDCI. In some examples, the CRC may be scrambled with a scramble bit sequence. The scramble bit sequence may include bits of the payload (e.g., an sDCI) and bits of an error detection code (e.g., one or more CRC bits). In some examples, the scrambling bit sequence may be different C-RNTIs. For example, the base station 205 may scramble the control information including the CRC using a C-RNTI scrambling bit sequence. The base station 205 may transmit the control information to the UE 215 on a downlink control channel (e.g., an sPDCCH).

The UE 215 may receive and demodulate control information received from the base station 205. For example, the UE 215 may decode the control information to identify information included within e.g., upcoming data transmission on an sPDSCH and information on how the data will be transmitted. In some cases, upon receiving the control information, the UE 215 may perform a measurement (e.g., an SINR) to identify one or more metrics. The UE 215 may perform this measurement to identify a channel quality (e.g., of an sPDCCH transmission) related to the data channel. The UE 215 may determine a code rate for a subband of the downlink control channel (e.g., sPDCCH) based on the measurement. In some cases, the UE 215 may also determine an aggregation level based on the code rate. In other examples, the UE 215 may determine a CQI, a pre-coding matrix indicator (PMI), a precoding type indicator (PTI), or a rank indicator (RI) based on the measurement. In some examples, to determine the CQI the UE 215 may consult a CQI table, as described in further detail below. The UE 215 may generate and transmit channel quality feedback data (e.g., a CQI value) to the base station 205.

The base station 205 may transmit data on a downlink physical channel such as an sPDSCH, which the UE 215 may be aware of (based on the received control information) and receive from the base station 205. In some cases, the data may include one or two transport blocks, whose duration may span the TTI 225 or one or more of the sTTIs 230. The UE 215 may receive the data and demodulate the transport blocks based on the MCS index and a modulation table (e.g., a modulation table that supports 64QAM, 256QAM, or 1024QAM). Additionally, the UE 215 may select a CQI index in a CQI table for reporting a CQI (or channel state information (CSI)) to the base station 205. In some cases, the wireless communications system 200 may support multiple modulation tables used by the UE 215 to demodulate a transmission. A modulation table and a CQI table may be selected by the UE 215 based on UE capability.

In some cases, the UE 215 may determine a capability for supporting an MCS. For example, the UE 215 may determine whether it can support an MCS for one or more scheduled transmissions associated with a TTI or an sTTI. For example, the UE 215 may determine whether it can support a 64QAM or 256QAM for the TTI 225 and/or the sTTIs 230. Additionally or alternatively, the UE 215 may be capable to support a higher MCS such as 1024QAM for a TTI or an sTTI. In some examples, the UE 215 may determine a capability for supporting an MCS for a transmission scheduled during an sTTI based on a length of the sTTI. For example, the UE 215 may determine that the sTTI 230-a has a length that supports a 256QAM, and that the sTTI 230-b has a length shorter than the sTTI 230-a and supports a 64QAM. In some cases, the UE 215 may determine a capability for supporting an MCS for a transmission scheduled during an sTTI based on a length of the sTTI satisfying a threshold length.

The UE 215 may communicate, to the base station 205, a UE capability message indicating the supported MCS. For example, the UE capability message may include an IE for indicating an MCS supported by the UE 215. In addition, the UE capability message may be communicated to the base station 205 via RRC signaling. In some examples, a transmission scheduled and associated with an sTTI or a TTI may be for a downlink transmission or an uplink transmission, or both. The UE 215 may report UE capability associated with the sTTI or the TTI, separately or jointly. For example, the UE 215 may transmit a single UE capability message for the TTI 225, the sTTI 230-a, and the sTTI 230-b.

Alternatively, the UE 215 may transmit separate UE capability message for sTTIs and TTIs. For example, the UE 215 may transmit a first UE capability message associated with the TTI 225 and a second UE capability message, different from the first UE capability message, associated with the sTTI 230-a or the sTTI 230-b. The UE 215 may transmit separate UE capability messages for different sTTIs (e.g., the sTTI 230-a and the sTTI 230-b). Alternatively, the UE 215 may transmit a combined UE capability message for multiple sTTIs (e.g., the sTTI 230-a and the sTTI 230-b), regardless of whether the sTTIs have a same or different length (e.g., duration). In some examples, the TTI 225 may be associated with downlink communications, and the sTTI 230-a or the sTTI 230-b may be associated with uplink communications. Alternatively, the TTI 225 may be associated with uplink communications, and the sTTI 230-a or the sTTI 230-b may be associated with downlink communications. In these examples, the UE 215 may transmit separate UE capability messages for downlink and uplink. The UE capability message may, in some examples, provide an indication of a modulation scheme supported by the UE 215 in downlink or uplink, or both. For example, a field in the UE capability message (e.g., dl-1024QAM-Slot-r15, dl-1024QAM-SubslotTA-r15, dl-1024QAM-SubslotTA-2-r15) may provide an indication that the UE 215 supports 1024QAM for downlink on a frequency spectrum band for slot TTI operation, or for subslot TTI operation. Additionally, or alternatively, a field in the UE capability message (e.g., ul-256QAM-Slot-r15, ul-256QAM-Subslot-r15) may provide an indication that the UE 215 support 256QAM for uplink on a frequency spectrum band for slot TTI operation or for subslot TTI operation, or both.

The UE 215 receive data on a downlink physical channel such as a PDSCH or an sPDSCH. The data may include one or two transport blocks, whose duration may span the TTI 225 or the sTTIs 230. As part of receiving the data, the UE 215 may demodulate the transport blocks based on the MCS index and a modulation table (e.g., a modulation table the supports 64QAM or 256QAM). With reference to the example above relating to the control information, the base station 205 may transmit an MCS index based on the capability provided in the UE capability message. The base station 205 may also configure a higher layer parameter such as an RRC parameter (e.g., altCQI-Table-STTI-r15) based on the capability received in the UE capability message from the UE 215. A higher layer parameter, such as an RRC parameter may be referred to as an altCQI-Table-STTI-15, altCQI-Table-1024QAM, tbsIndexAlt-STTI, tbsIndexAlt2-STTI, tbsIndexAlt3-STTI. Although an RRC parameter may be referred to by different terms (e.g., an altCQI-Table-STTI-15, tbsIndexAlt-STTI, tbsIndexAlt2-STTI, tbsIndexAlt3-STTI), it should be understood that the different terms defining an RRC parameter may have same or similar functions and operations associated with it. In some cases, the parameter may be configured for each cell (e.g., a serving base station and neighboring base station) and for a subset or all subframes associated with a transmission (e.g., downlink and/or uplink transmission).

In some examples, the parameter may indicate an applicability of TBS index (or TBS table) that the UE 215 may use to provide CQI feedback to the base station 205. For example, a higher layer parameter (e.g., tbsIndexAlt-STTI) may indicate an applicability of a TBS index for one or more slots subslots, sTTIs, TTIs scheduled by a first DCI format (e.g., a DCI format 7-1F, a DCI form 7-1G). Here, a TBS index may be 33 based in part on the configured higher layer parameter, for example. In some examples, a higher layer parameter (e.g., tbsIndexAlt2-STTI) may indicate an applicability of a TBS index for one or more slots subslots, sTTIs, TTIs scheduled by a second DCI format (e.g., a DCI format 7-1B, a DCI format 7-1C, a DCI form 7-1D). Here, a TBS index may be 33/B based in part on the configured higher layer parameter, for example. In other examples, a higher layer parameter (e.g., tbsIndexAlt3-STTI) may indicate an applicability of a TBS index for one or more slots subslots, sTTIs, TTIs scheduled by a third DCI format (e.g., a DCI format 7-1B, a DCI format 7-1C, a DCI form 7-1D). Here, a TBS index may be 37A//B based in part on the configured higher layer parameter, for example The TBS index may be part of a CQI table. In some examples, if the higher layer parameter is not configured, the UE 215 may use a default TBS (e.g., preconfigured TBS).

The parameter may indicate an applicability of a CQI table that the UE 215 may use to provide CQI feedback to the base station 205. In addition, the parameter may include the applicability of the CQI table for both aperiodic and periodic CSI reporting for the UE 215 (and the concerned serving cell associated with the base station 205). The higher layer parameter may additionally, or alternatively, include a modulation table indicator that may indicate a modulation table (e.g., supporting up to 64QAM, 256QAM, or 1024QAM) for the UE 215 to use in demodulating a transmission from the base station 205, or modulating a transmission to the base station 205 during the TTI 225 and/or at least one of the sTTI 230. In some cases, the base station 205 may configure the higher layer parameter based on the UE capability (i.e., information for supporting a particular MCS) provided by the UE 215. The base station 205 may configure the higher layer parameter separately or jointly. For example, the base station 205 may configure a higher layer parameter for the TTI 225 and the sTTIs 230 mutually, or separately for the TTI 225 and each of the sTTIs 230.

The higher layer parameter may also be configured with at least one sub-parameter from a set of sub-parameters by the base station 205. For example, the set of sub-parameters may include {allSubframes, csi-SubframesSet1, csi-SubframeSet2, spare1}. The UE 215 may select a CQI table, subsequently to selecting a modulation table, based on the sub-parameter assigned. In some cases, the sub-parameter may be configured for different sTTIs such as the sTTI 230-$a$ and the sTTI 230-$b$. That is, a same configuration may apply for both sTTIs 230, or a first configuration may apply to the sTTI 230-$a$ and a second configuration may apply to the sTTI 230-$b$ based on the sub-parameter for the CQI configuration.

For example, the configured parameter may include a set of sub-parameters for configuring the CQI feedback. The set may include {allSubframes, csi-SubframeSet1, csi-SubframeSet2, spare1}. The UE 215 may provide aperiodic or periodic CQI reporting for the base station 205 based on at least one of the sub-parameters of the set. The sub-parameter may be configured by the base station 205. In an example, if the sub-parameter is set to allSubframes, the CQI table may apply to all subframes (or sTTIs, TTIs). Alternatively, if the sub-parameter is set to csi-SubframeSet1, the CQI table may apply to CSI subframe set 1, or if the sub-parameter is set to csi-SubframeSet2, the CQI table may apply to SSI subframe set 2.

In some cases, the UE 215 may select a CQI table for CQI reporting based on the UE capability supporting a particular MCS, and determining that the higher layer parameter is configured, and that the sDCI format is an acceptable DCI format from a list of DCI formats. For example, selection of the CQI table may be based on the UE 215 determining that an sPDSCH is assigned by a sPDCCH with a specific sDCI format (e.g., an sDCI format 7-1B, an sDCI format 7-1C, an sDCI format 7-1D, an sDCI format 7-1E, an sDCI format 7-1F, and/or an sDCI format 7-1G), and that the sPDCCH is scrambled with a C-RNTI. The base station 205 may scramble the sDCI including a CRC using a C-RNTI scrambling bit sequence.

As such, selection of a modulation table for a transmission associated with an sTTI may be based on determining that the higher layer parameter is configured (e.g., enabled), or that the DCI format is an acceptable DCI format, or that the CRC is scrambled with the C-RNTI, or any combination thereof. The UE 215 may be configured with a default modulation table for the transmission associated the TTI 225 and/or the sTTIs 230. Alternatively, the UE 215 may select a modulation table based on a modulation table indicator provided in an IE field carried in a DCI or sDCI. For example, the UE 215 may identify the modulation table based on a bit value of the IE field.

In some examples, the UE 215 may select a first CQI table (e.g., supporting up to 256QAM) to transmit CQI reporting, based on determining that the higher layer parameter is configured and is set to allSubframes. For example, if at least one sub-parameter (e.g., allSubframes) from a set of sub-parameters of a higher layer parameter (e.g., altCQI-TableSTTI-r15) is configured/set, and when aperiodic CSI is triggered based in part on a specific DCI format (e.g., DCI format 7-0A or 7-0B), the UE 215 may select an appropriate CQI table for CQI reporting. Alternatively, if at least one sub-parameter (e.g., allSubframes) from a set of sub-parameters of the higher layer parameter (e.g., altCQI-Table 1024QAM-STTI-r15) is configured/set, and when aperiodic CSI is triggered based in part on a specific DCI format (e.g., DCI format 7-0A or 7-0B), the UE 215 may select a different CQI table for CQI reporting Alternatively, the UE 215 may select the first CQI table based on the higher layer parameter being configured and set to csi-SubframeSet1 or csi-SubframeSet2. In this case, the UE 215 may transmit CQI reporting according to the first CQI table and corresponding to the subframes configured by the higher layer parameter (e.g., csi-SubframeSet1 or csi-SubframeSet2), or the UE 215 may transmit the CQI reporting according to a second CQI table (e.g., supporting up to 64QAM) for the other set (i.e., csi-SubframeSet1 or csi-SubframeSet2). For example, if at least one sub-parameter (e.g., csi-SubframeSet1 or csi-SubframeSet2) from a set of sub-parameters of a higher layer parameter (e.g., altCQI-TableSTTI-r15) is configured/set, and when aperiodic CSI is triggered based in part on a DCI format (e.g., DCI format 7-0A or 7-0B), the UE 215 may select an appropriate CQI table for CQI reporting for corresponding CSI subframes configured by the higher layer parameter (e.g., altCQI-TableSTTI-r15). Alternatively, if at least one sub-parameter (e.g., csi-SubframeSet1 or csi-SubframeSet2) from a set of sub-parameters of a higher layer parameter (e.g., altCQI-Table 1024QAM-STTI-r15) is configured/set, and when aperiodic CSI is triggered based in part on a DCI format (e.g., DCI format 7-0A or 7-0B), the UE 215 may select an appropriate CQI table for CQI reporting for corresponding CSI subframes configured by the higher layer parameter (e.g., altCQI-Table1024QAM-STTI-r15). In this example, the UE 215 may report CQI for the other CSI subframe set according to a different CQI table.

In some examples, the UE 215 may select an appropriate CQI table for CQI reporting for corresponding CSI subframes configured by the higher layer parameter without basing the selection on a DCI format. For example, if at least one sub-parameter (e.g., allSubframes) from a set of sub-parameters of a higher layer parameter (e.g., altCQI-Table-r12) is configured/set, the UE 215 may select an appropriate CQI table for CQI reporting for corresponding CSI subframes configured by the higher layer parameter (e.g., altCQI-Table-r12). In other examples, if at least one sub-parameter (e.g., allSubframes) from a set of sub-parameters of a higher layer parameter (e.g., altCQI-Table-1024QAM-r15) is configured/set, the UE 215 may select an appropriate CQI table for CQI reporting for corresponding CSI subframes configured by the higher layer parameter (e.g., altCQI-Table-r12).

In some cases, if the UE 215 determines that the higher layer parameter is not configured (e.g., disabled), the UE 215 may be configured to transmit CQI reporting according to a default CQI table (e.g., a CQI table supporting up to 64QAM). The base station 205 may receive CQI reporting from the UE 215, and is some cases adjust an MCS for the UE 215 based on the CQI reporting The UE 215 may select a modulation table for uplink communication (e.g., modulating or demodulation transport blocks) to the base station 205, a transmission associated with the TTI 225 and/or the sTTIs 230 based on the higher layer parameter and the determined capability of the UE 215. For example, the UE 215 may select a modulation table that supports 256QAM based at least in part on a UE capability and the higher layer parameter being configured (e.g., enabled or disabled). The UE 215 may determine a modulation order in the selected modulation table based on the received MCS index. Alternatively, the UE 215 may select a modulation table that supports 64QAM, to determine a modulation order used for demodulation transport blocks in the PDSCH, based on determining that a sDCI format is an unacceptable format, and that a sDCI is not scrambled with a C-RNTI.

The UE 215 may also transmit uplink data to the base station 205 including uplink control information (UCI) on a sPUSCH or PUSCH. In some cases, the UE 215 may provide other various control signaling on a PUCCH such as, scheduling requests, downlink data acknowledgment and non-acknowledgment (ACK/NACK) (e.g., Hybrid ARQ (HARD) feedback), and a CQI. In some examples, the feedback may be an ACK if the UE 215 determined data intended for it on the PDSCH and the UE 215 did not detect any transmission error on the PDSCH data. Alternatively, the UE 215 may transmit a NACK if the UE 215 recognized data intended for it on the PDSCH, but the UE 215 detected some transmission error on the PDSCH data.

The UE 215 may also determine a modulation order for an uplink transmission associated with the TTI 225 and/or the sTTIs 230. The modulation order for the uplink transmission may be determined in a modulation table selected based on a UE capability (e.g., whether the UE 215 supports 64QAM or 256QAM), a transport block transmission (e.g., whether a transport block was initially transmitted with a grant according to a new or preconfigured DCI format (e.g., an sDCI format 7-1B, an sDCI format 7-1C, an sDCI format 7-1D, an sDCI format 7-1E, an sDCI format 7-1F, and/or an sDCI format 7-1G, or a DCI format 0/4)), or a PUSCH transmission (e.g., whether the PUSCH transmission is initiated by a grant received during a RACH procedure), or any combination thereof. In some cases, the UE 215 may determine a modulation order based on a recent semi-persistent scheduling assignment received (e.g. in a PDCCH or an enhanced ePDCCH), when an initial PUSCH for a same transport block is semi-persistently scheduled. The UE 215 may alternatively, determine a modulation order based on a RACH response grant for the same transport block, when the PUSCH is initiated by the RACH response grant.

Figure 3:
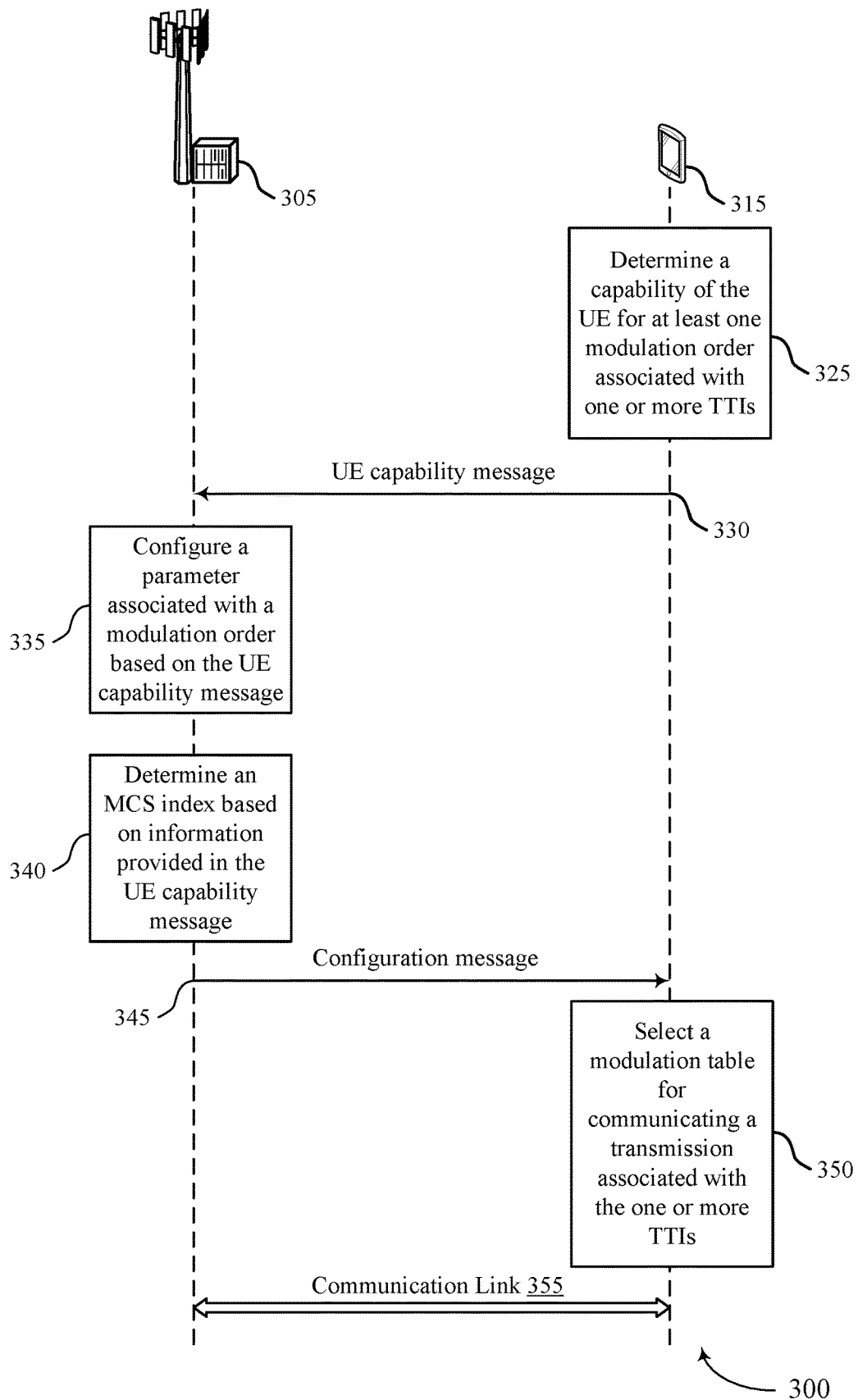
FIG. 3 illustrates an example of a process flow that supports modulation table determination and CQI reporting in accordance with aspects of the present disclosure.

FIG. 3 illustrates an example of a process flow 300 that supports modulation table determination and CQI reporting in accordance with various aspects of the present disclosure. In some examples, process flow 300 may implement aspects of the wireless communications systems 100 and 200. The operations of the process flow 300 may be implemented by a UE or a base station or its components as described herein. For example, the operations of the process flow 300 may be implemented by a base station 305 and a UE 315. In some examples, the base station 305 and the UE 315 may execute a set of codes to control the functional elements of the base station 305 and the UE 315. The base station 305 and the UE 315 may be examples of the corresponding devices described with reference to FIGS. 1 and 2.

In the following description of the process flow 300, the operations between the base station 305 and the UE 315 may be transmitted in a different order than the exemplary order shown, or the operations performed by the base station 305 and the UE 315 may be performed in different orders or at different times. Certain operations may also be left out of the process flow 300, or other operations may be added to the process flow 300.

In some examples, the process flow 300 may commence with the base station 305 establishing a connection with the UE 315 (e.g., performing a cell acquisition procedure, random access procedure, RRC connection procedure, RRC configuration procedure).

At 325, the UE 315 may determine a capability of the UE 315 for at least one modulation order associated with one or more TTIs. The modulation order may be associated with an MCS such as 64QAM, a 256QAM, or a 1024QAM. In some cases, some of the TTIs may be sTTIs. For example, a first TTI may have a 1 ms duration while a second TTI may be an sTTI that has a duration less than 1 ms (e.g., 0.5 ms). After the UE 315 determines the capability, the UE 315 may generate a UE capability message indicating the capability of the UE 315.

At 330, the UE 315 may transmit the UE capability message to the base station 305. In some examples, the UE capability message may be for downlink or uplink, or both. In some cases, the UE 315 may provide capability associated with the one or more TTIs including any sTTIs in a single UE capability message. Alternatively, the UE 315 may transmit separate UE capability messages for a TTI and an sTTI. In the example of a first TTI and a second TTI being an sTTI, the UE 315 may indicate UE capability associated with the first TTI in a first UE capability message and UE capability associated with the second TTI in a second UE capability message. Additionally, in the case that the UE 315 is scheduled for one or more transmissions during a number of sTTIs, the UE 315 may provide separate indications of UE capability for each of the sTTI. In some cases, the capability may indicate an MCS supported by the UE for one or each of the TTI and/or sTTI.

At 335, the base station 305 may configure a parameter associated with a modulation order based on the UE capability message. In some cases, the parameter may be a higher layer parameter (e.g., altCQI-Table-STTI-r15). The parameter may indicate an applicability of a CQI table that the UE 315 may use to provide CQI feedback to the base station 305. In addition, the parameter may include the applicability of the CQI table for both aperiodic and periodic CSI reporting for the UE 315. In some cases, configuring the parameter may include enabling or disabling a field in a configuration message. For example, the parameter may be part of an RRC configuration message. The base station 305 may enable or disable the parameter via a bit value. As such, based on the bit value the UE 315 may be capable to determine if the parameter is configured.

At 340, the base station 305 may determine an MCS index based on information provided in the UE capability message, for example, such as current channel conditions, a supporting MCS. At 345, the base station 305 may transmit a configuration message. The configuration message may, for example, include the parameter and the MCS index.

At 350, the UE 315 may select a modulation table for communicating a transmission associated with the one or more TTIs. The UE 315 may determine a modulation order in the selected modulation table based on the MCS index. Additionally, the UE 315 may provide CQI feedback to the base station 305 by selecting a CQI table based on the configured parameter. For example, the configured parameter may include a set of sub-parameters for configuring the CQI feedback. The set may include {allSubframes, csi-SubframeSet1, csi-SubframeSet2, spare1}. The UE 315 may provide aperiodic or periodic CQI reporting for the base station 305 based on at least one of the sub-parameters of the set. The sub-parameter may be configured by the base station 305. In an example, if the sub-parameter is set to allSubframes, the CQI table may apply to all subframes (or sTTIs, TTIs). Alternatively, if the sub-parameter is set to csi-SubframeSet1, the CQI table may apply to CSI subframe set 1, or if the sub-parameter is set to csi-SubframeSet2, the CQI table may apply to SSI subframe set 2. In some cases, the applicability of the CQI table may be based on the UE capability (e.g., whether the UE 315 supports a certain MCS), whether the parameter is configured (e.g., enabled or disabled), and/or based on a DCI format used to schedule the transmission (e.g., a sPDSCH) associated with the one or more sTTIs and/or TTIs. As such, the UE 315 may communicate the transmission associated with the one or more TTIs including CQI feedback using the communication link 355.

Figure 4:
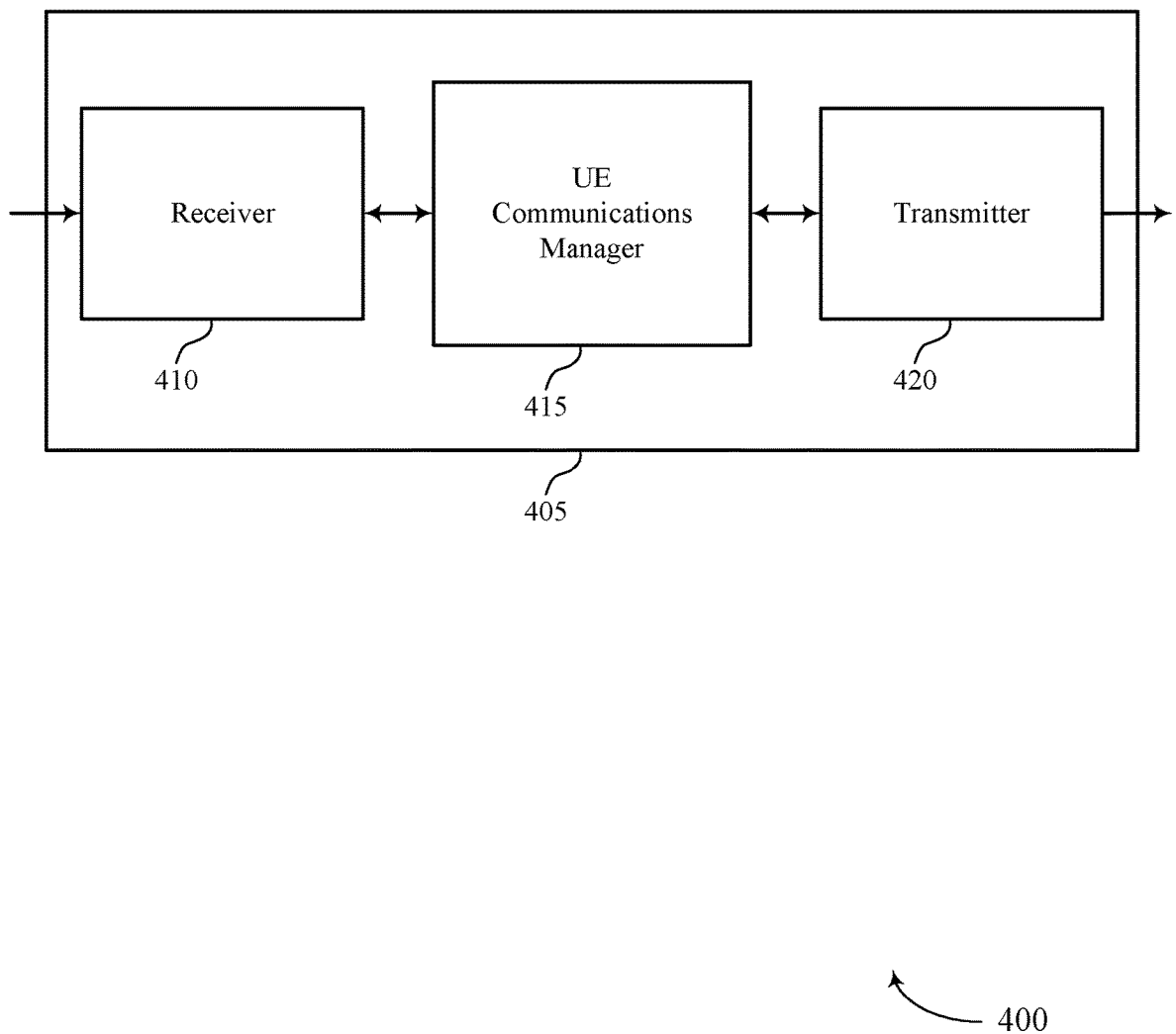
FIGS. 4 through 6 show block diagrams of a device that supports modulation table determination and CQI reporting in accordance with aspects of the present disclosure.

FIG. 4 shows a block diagram 400 of a wireless device 405 that supports modulation table determination and CQI reporting in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to modulation table determination and CQI reporting, etc.). Information may be passed on to other components of the device. The receiver 410 may be an example of aspects of the transceiver 735 described with reference to FIG. 7. The receiver 410 may utilize a single antenna or a set of antennas.

Receiver 410 may receive a message including a parameter and an MCS index based on the UE capability message and receive the message via a sPDCCH. In some cases, the message may also include an allocation of resources, or configuration information for one or more physical channels, or CQI reporting, or any combination thereof. In some cases, the configuration information includes a transmission configuration for the first TTI and the second TTI, and the CQI reporting is based on the configuration information. In some cases, the parameter includes an indication of UE capability for a 64QAM, a 256QAM, or a 1024QAM. In some cases, the parameter is a higher layer parameter.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may determine a capability of the UE for at least one modulation order associated with a first TTI and a second TTI that is shorter than the first TTI and select a modulation table for communicating, to a base station, a transmission associated with the first TTI and the second TTI based on receiving the message.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Transmitter 420 may transmit a UE capability message based on determining the UE capability. The transmitter 420 may transmit a second UE capability information message separate from the UE capability message indicating capability of the UE for the second TTI. The transmitter 420 may transmit a UE capability message for at least some sTTIs of the set of sTTIs. The parameter and the MCS index may be associated with the set of sTTIs or each sTTI is associated with a separate parameter and MCS index. In some cases, the UE capability message is associated with the set of sTTIs. In some examples, the transmitter 420 may transmit a second UE capability message separate from the UE capability message. In some examples, the UE capability message may be for uplink and the second UE capability message may be for downlink, or vice versa.

Figure 5:
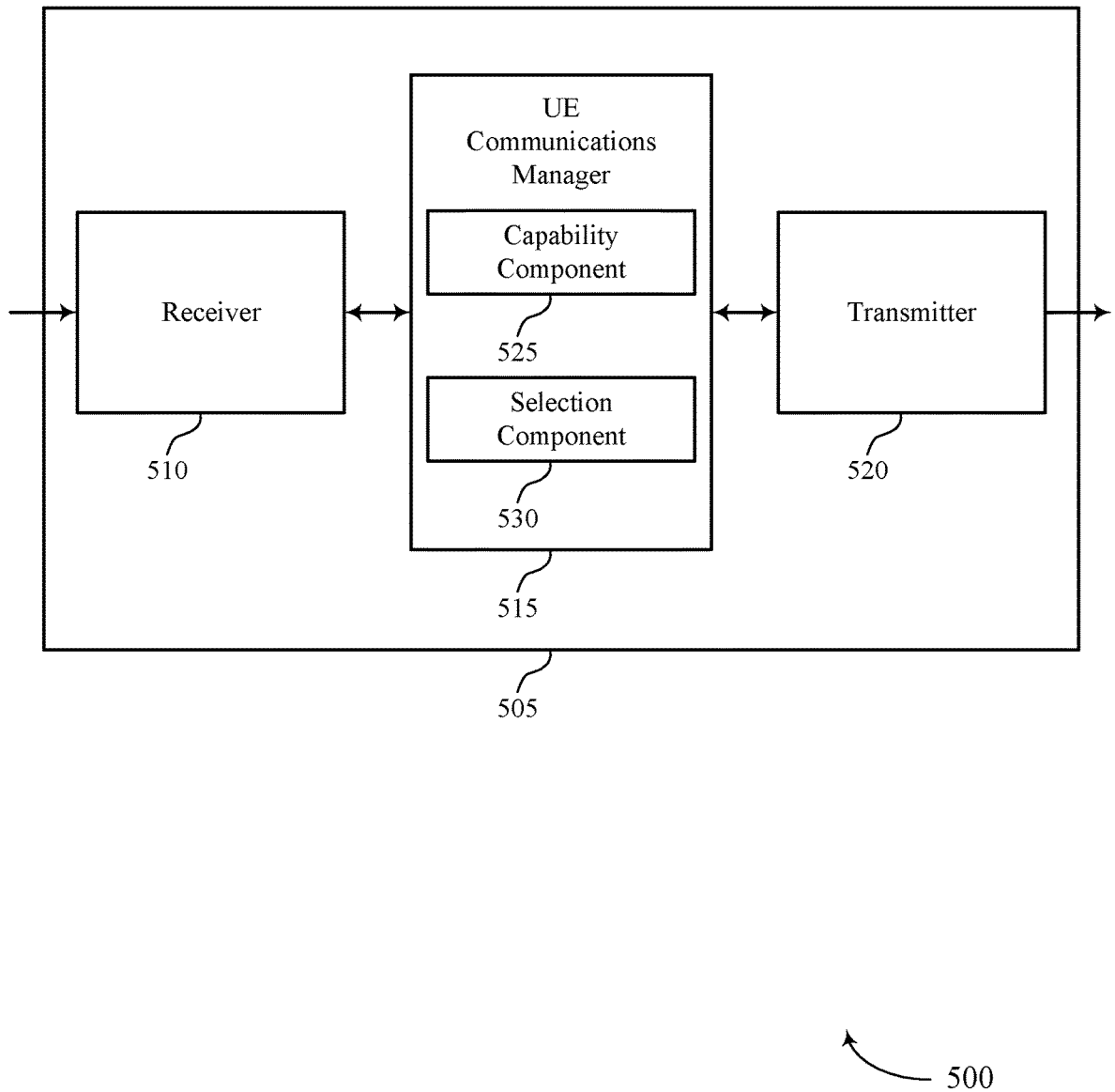

FIG. 5 shows a block diagram 500 of a wireless device 505 that supports modulation table determination and CQI reporting in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to modulation table determination and CQI reporting, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include capability component 525 and selection component 530.

The capability component 525 may determine a capability of the UE for at least one modulation order associated with a first TTI and a second TTI that is shorter than the first TTI. In some cases, the second TTI is an sTTI. In some cases, the UE capability message includes UE capability for both the first TTI and the second TTI. In some cases, the second TTI includes a set of sTTIs. In some cases, at least a subset of the sTTIs include variable lengths.

The selection component 530 may select a modulation table for communicating, to a base station, a transmission associated with the first TTI and the second TTI based on receiving the message. The selection component 530 may determine whether the parameter is enabled or disabled. In some examples, selecting the modulation table is based on determining whether the parameter is enabled. The selection component 530 may identify the modulation table based on a bit value of the IE field. In some examples, selecting the modulation table is based on the identifying.

The selection component 530 may monitor a downlink control channel for a message including a C-RNTI associated with the UE. In some examples, selecting the modulation table is further based on the message including the C-RNTI. The selection component 530 may select the modulation table for the uplink transmission based on the received MCS index. In some cases, the UE is configured with a default modulation table for the transmission associated with the first TTI and the second TTI. In some cases, the transmission is a downlink transmission or an uplink transmission.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
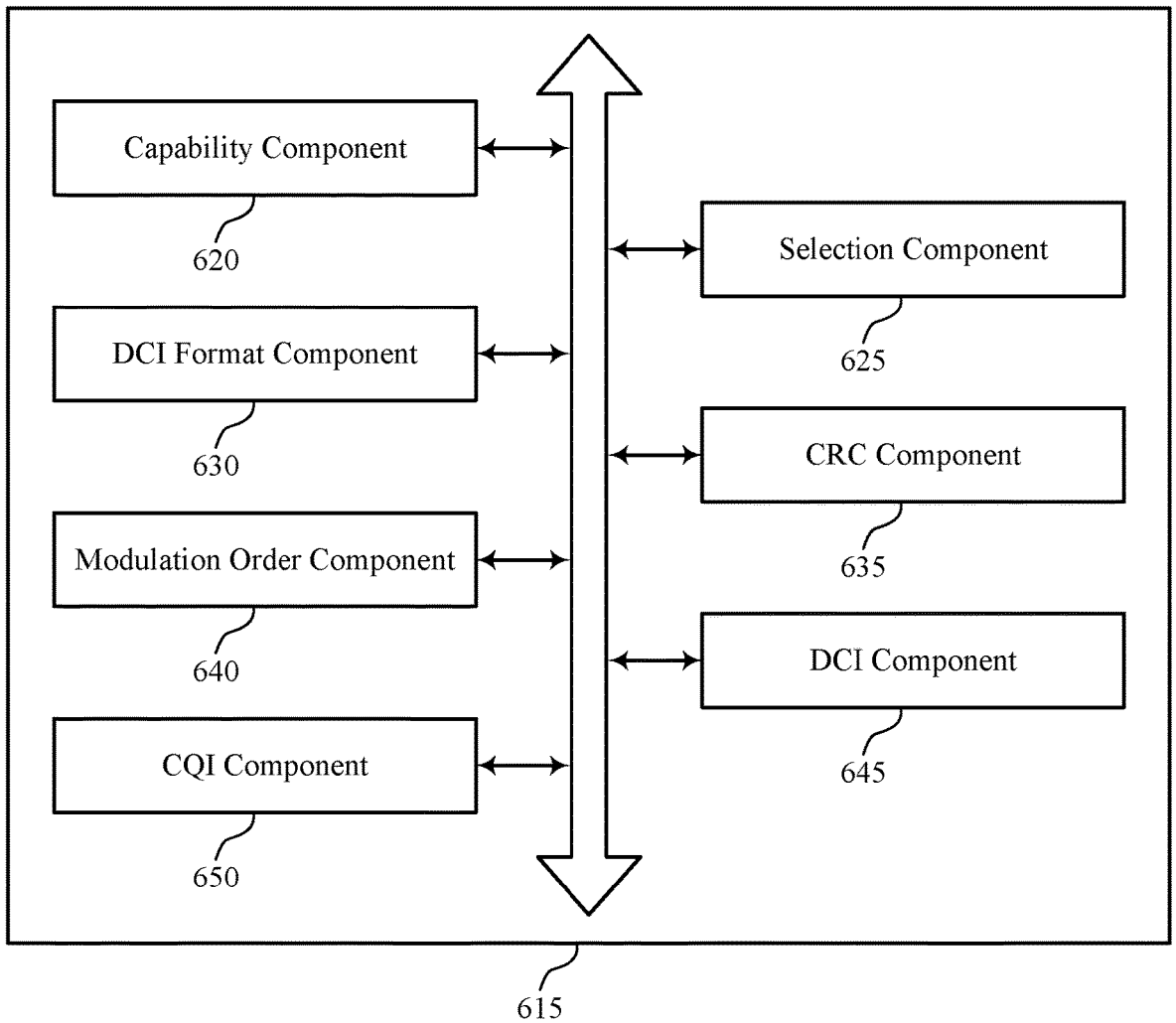

FIG. 6 shows a block diagram 600 of a UE communications manager 615 that supports modulation table determination and CQI reporting in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include capability component 620, selection component 625, DCI format component 630, CRC component 635, modulation order component 640, DCI component 645, and CQI component 650. Each of these modules may communicate, directly or indirectly, with one another (e.g., via one or more buses).

Capability component 620 may determine a capability of the UE for at least one modulation order associated with a first TTI and a second TTI that is shorter than the first TTI. In some cases, the second TTI is an sTTI. In some cases, the UE capability message includes UE capability for both the first TTI and the second TTI. In some cases, the second TTI includes a number of sTTIs. In some cases, at least a subset of the sTTIs may be variable lengths.

Selection component 625 may select a modulation table for communicating, to a base station, a transmission associated with the first TTI and the second TTI based on receiving the message. The selection component 625 may determine whether the parameter is enabled or disabled. In some examples, selecting the modulation table is based on determining whether the parameter is enabled. The selection component 625 may identify the modulation table based on a bit value of the IE field. In some examples, selecting the modulation table is based on the identifying. The selection component 625 may monitor a downlink control channel for a message including a C-RNTI associated with the UE. In some examples, selecting the modulation table is further based on the message including the C-RNTI. The selection component 625 may select the modulation table for the uplink transmission based on the received MCS index. In some cases, the UE is configured with a default modulation table for the transmission associated with the first TTI and the second TTI. In some cases, the transmission is a downlink transmission or an uplink transmission.

DCI format component 630 may determine a DCI format associated with the sPDCCH and determine that the DCI format is an acceptable DCI format from a list of DCI formats based on determining that the parameter is enabled. CRC component 635 may determine that a CRC associated with the sPDCCH is scrambled with a C-RNTI of the UE and determine that the CRC is scrambled with the C-RNTI of the UE.

Modulation order component 640 may determine a modulation order in the modulation table based on the MCS index. In some examples, selecting the modulation table is based on determining that the parameter is enabled, or the DCI format is the acceptable DCI format, or that the CRC is scrambled with the C-RNTI, or any combination thereof. The modulation order component 640 may determine a modulation order in the selected modulation table based on the MCS index. In some examples, selecting the modulation table is based on determining that the parameter is disabled. The modulation order component 640 may determine a modulation order in the selected modulation table based on the MCS index. The modulation order component 640 may determine a modulation order in the selected modulation table for the uplink transmission based on the MCS index and a DCI format associated with the received message. The modulation order component 640 may determine the modulation order for the uplink transmission based on semi-persistent scheduling or a random access response grant.

DCI component 645 may receive a DCI including an IE field for a modulation table indicator. CQI component 650 may select a CQI table based on a CQI reporting configuration. In some cases, the CQI reporting configuration associated with CQI reporting indicates that the CQI table applies to the first TTI or the second TTI, or both.

Figure 7:
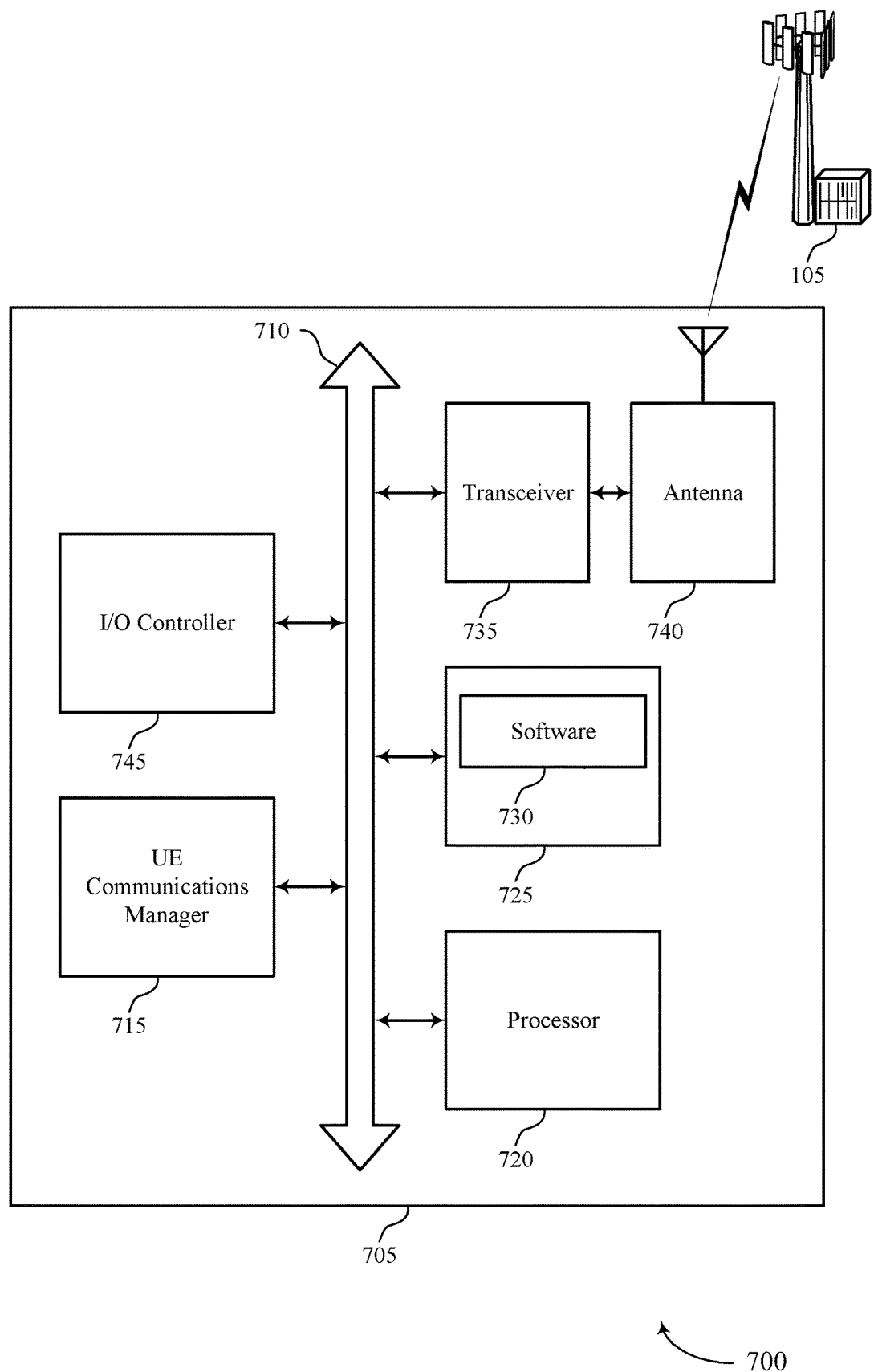
FIG. 7 illustrates a block diagram of a system including a UE that supports modulation table determination and CQI reporting in accordance with aspects of the present disclosure.

FIG. 7 shows a diagram of a system 700 including a device 705 that supports modulation table determination and CQI reporting in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting modulation table determination and CQI reporting).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support modulation table determination and CQI reporting. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the device 705 may include a single antenna 740. However, in some cases the device 705 may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS, ANDROID, MS-DOS, MS-WINDOWS, OS/2, UNIX, LINUX, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
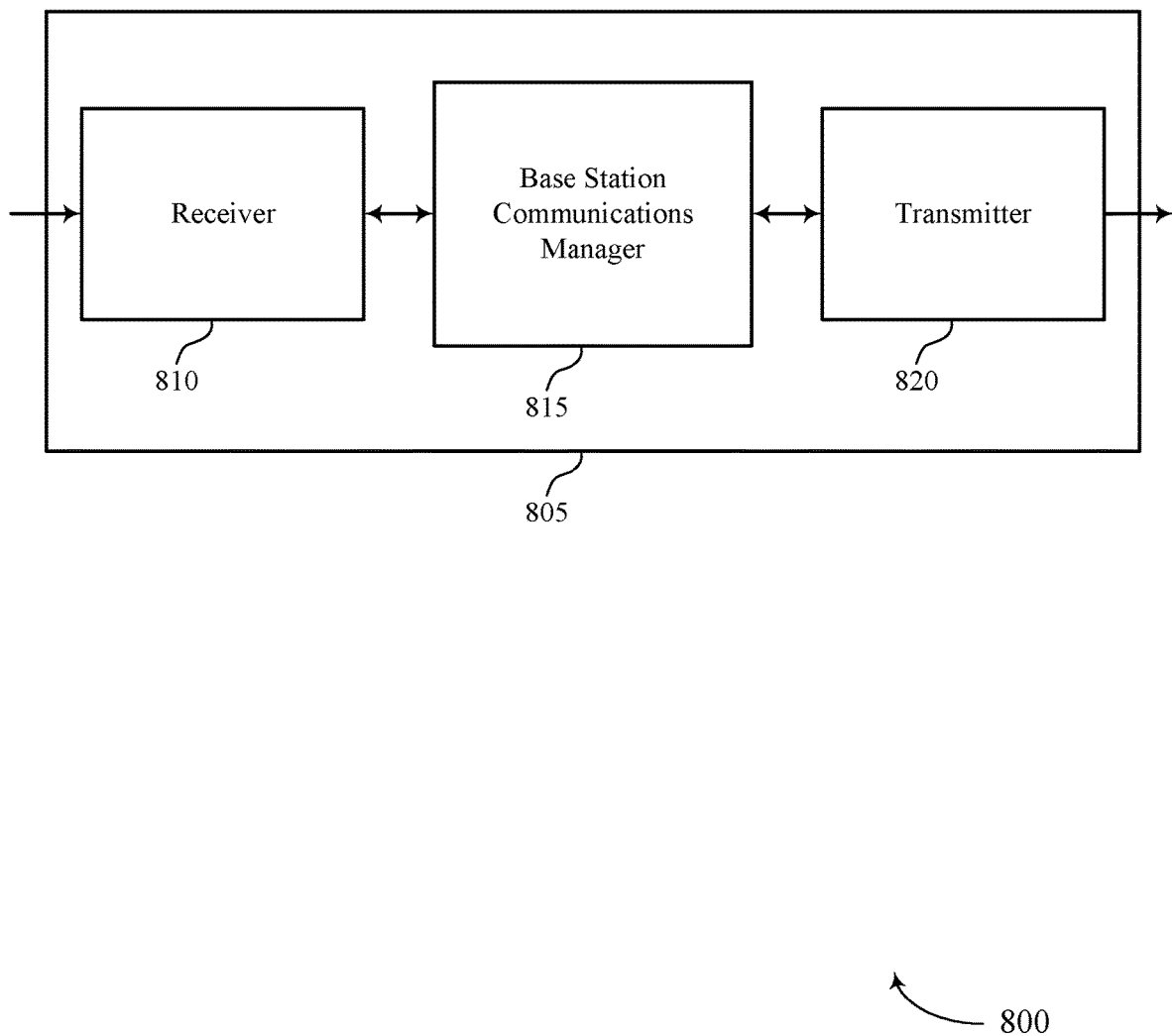
FIGS. 8 and 9 show block diagrams of a device that supports modulation table determination and CQI reporting in accordance with aspects of the present disclosure.

FIG. 8 shows a block diagram 800 of a wireless device 805 that supports modulation table determination and CQI reporting in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to modulation table determination and CQI reporting, etc.). Information may be passed on to other components of the device. The receiver 810 may be an example of aspects of the transceiver 1035 described with reference to FIG. 10. The receiver 810 may utilize a single antenna or a set of antennas.

Receiver 810 may receive a UE capability message for at least one modulation order associated with a first TTI and a second TTI that is shorter than the first TTI. The receiver 810 may receive a second UE capability information message separate from the UE capability message indicating capability for the second TTI. In some cases, the second TTI is an sTTI. In some cases, the UE capability message includes UE capability for both the first TTI and the second TTI. In some cases, the second TTI includes a set of sTTIs. In some cases, the UE capability message is associated with the set of sTTIs. In some examples, the receiver 810 may receive a second UE capability message separate from the UE capability message. In some examples, the UE capability message may be for uplink and the second UE capability message may be for downlink, or vice versa.

Base station communications manager 815 may be an example of aspects of the base station communications manager 1015 described with reference to FIG. 10. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may configure a parameter associated with a modulation table based on the UE capability message and determine an MCS index based on the UE capability message.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Transmitter 820 may transmit a message including the parameter and the MCS index and transmit the message via a sPDCCH. In some cases, the message further includes an allocation of resources, or configuration information for one or more physical channels, or CQI reporting, or any combination thereof. In some cases, the configuration information includes a transmission configuration for the first TTI and a second TTI, and the CQI reporting is based on the configuration information.

Figure 9:
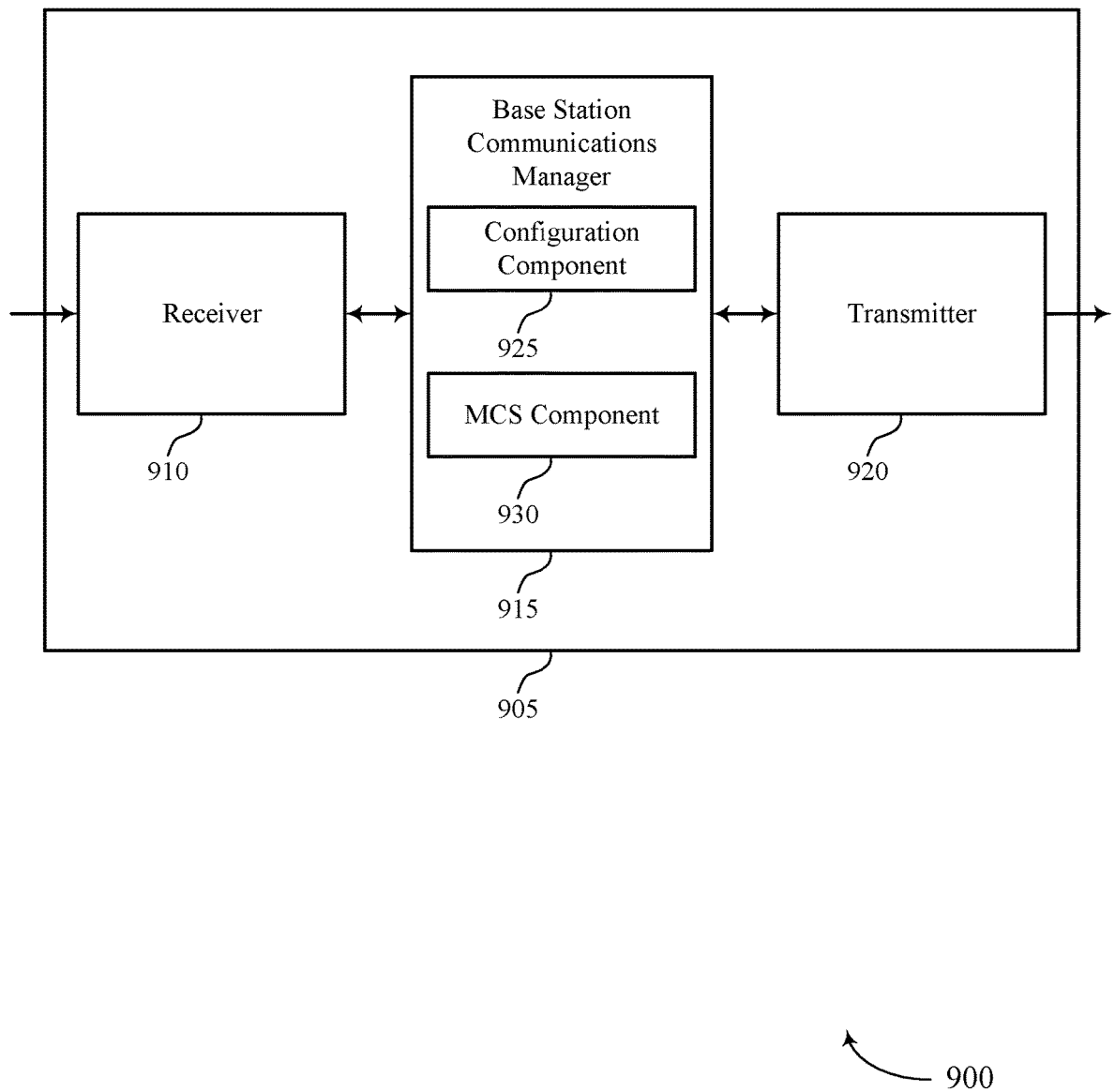

FIG. 9 shows a block diagram 900 of a wireless device 905 that supports modulation table determination and CQI reporting in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to modulation table determination and CQI reporting, etc.). Information may be passed on to other components of the device. The receiver 910 may be an example of aspects of the transceiver 1035 described with reference to FIG. 10. The receiver 910 may utilize a single antenna or a set of antennas.

Base station communications manager 915 may be an example of aspects of the base station communications manager 1015 described with reference to FIG. 10. Base station communications manager 915 may also include configuration component 925 and MCS component 930.

Configuration component 925 may configure a parameter associated with a modulation table based on the UE capability message. The configuration component 925 may enable the parameter based on the UE capability message. In some examples, configuring the parameter includes enabling or disabling the parameter based on the UE capability message. MCS component 930 may determine an MCS index based on the UE capability message.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
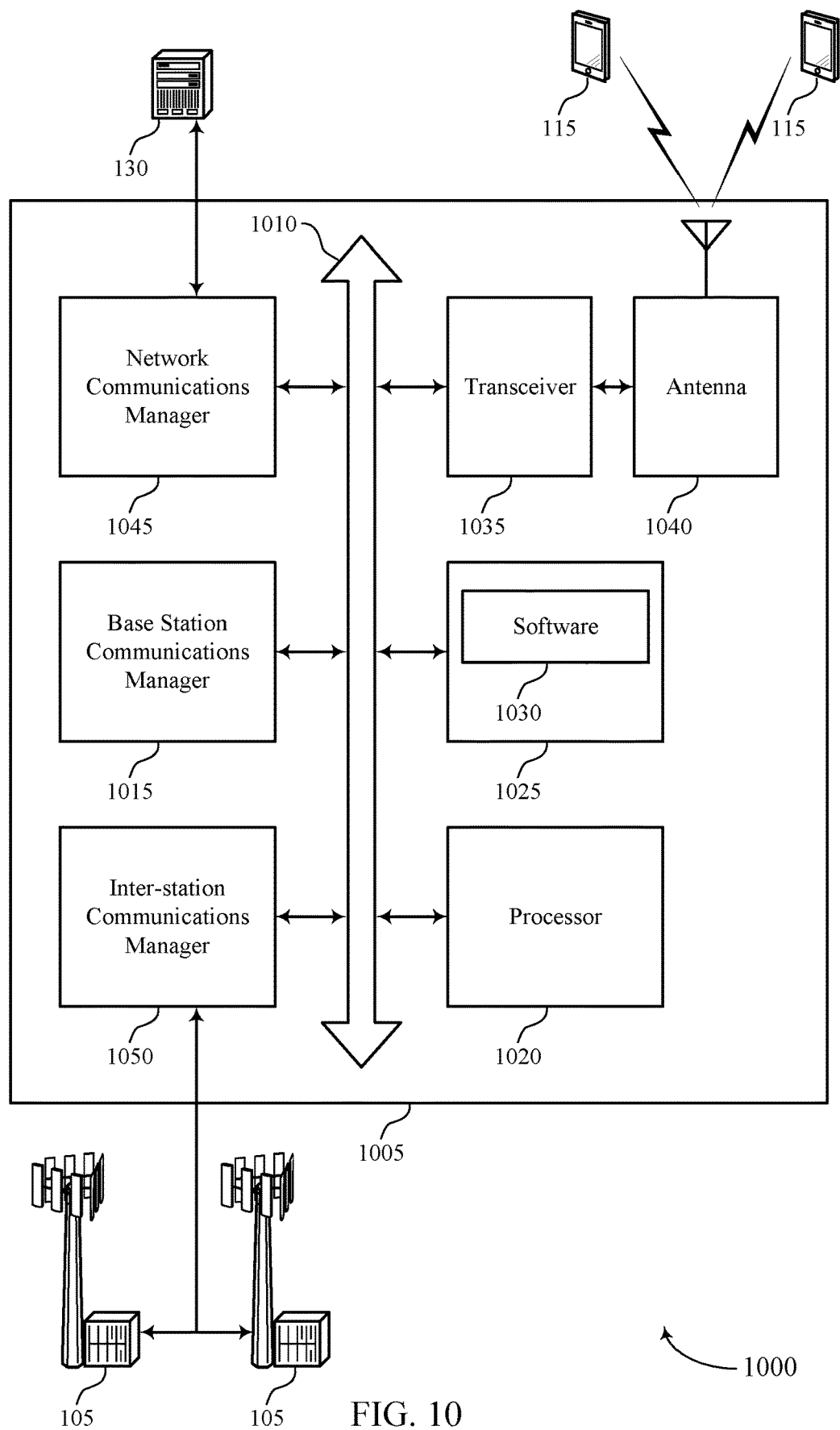
FIG. 10 illustrates a block diagram of a system including a base station that supports modulation table determination and CQI reporting in accordance with aspects of the present disclosure.

FIG. 10 shows a diagram of a system 1000 including a device 1005 that supports modulation table determination and CQI reporting in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting modulation table determination and CQI reporting).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support modulation table determination and CQI reporting. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the device 1005 may include a single antenna 1040. However, in some cases the device 1005 may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
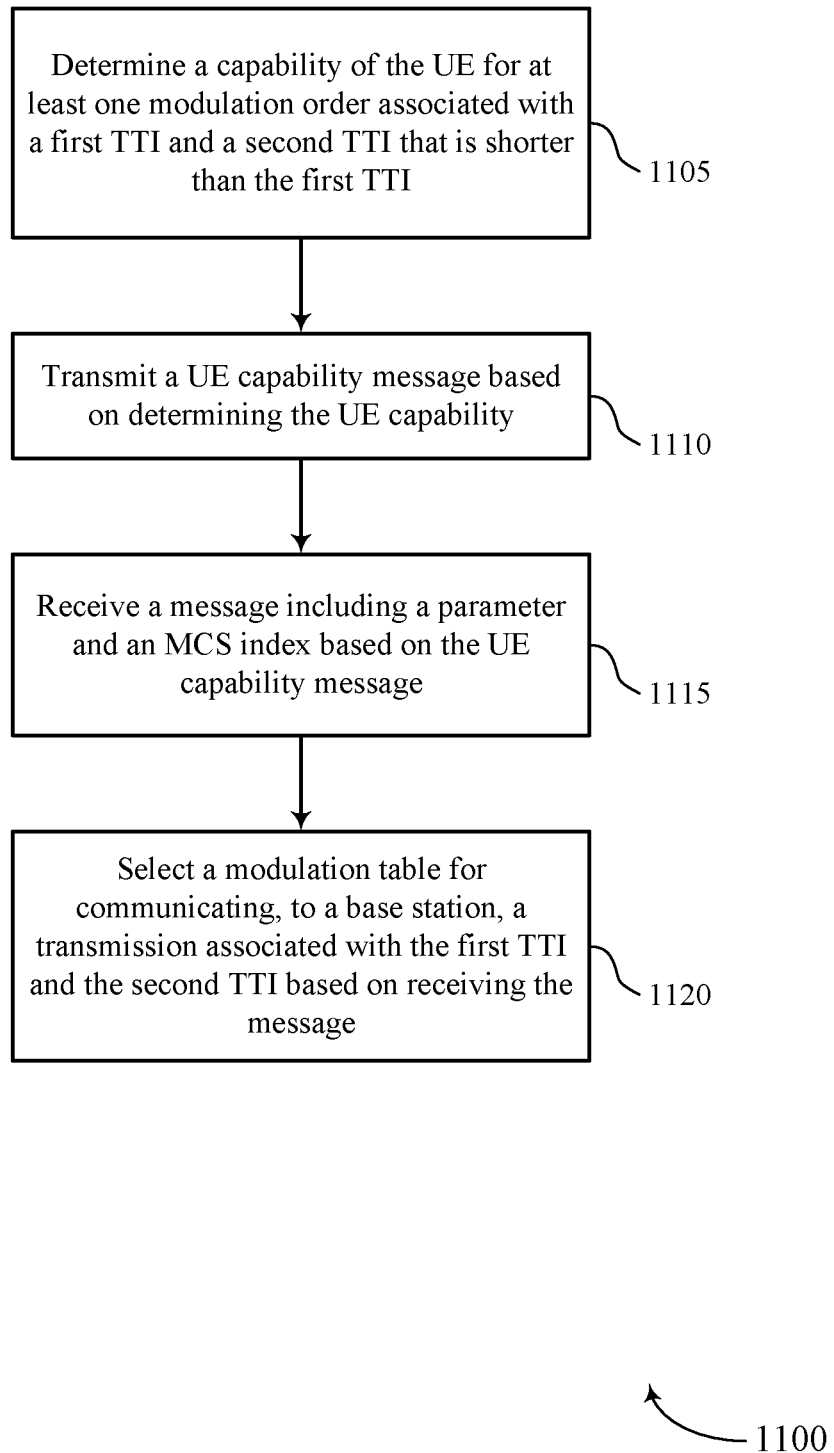
FIGS. 11 through 16 illustrate a method or methods for modulation table determination and CQI reporting in accordance with aspects of the present disclosure.

FIG. 11 shows a flowchart illustrating a method 1100 for modulation table determination and CQI reporting in accordance with aspects of the present disclosure. The operations of method 1100 may be implemented by a UE 115 or its components as described herein. For example, the operations of method 1100 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may determine a capability of the UE 115 for at least one modulation order associated with a first TTI and a second TTI that is shorter than the first TTI. The operations of 1105 may be performed according to the methods described herein. In certain examples, aspects of the operations of 1105 may be performed by a capability component as described with reference to FIGS. 4 through 7.

At 1110 the UE 115 may transmit a UE capability message based on determining the UE capability. The operations of 1110 may be performed according to the methods described herein. In certain examples, aspects of the operations of 1110 may be performed by a transmitter as described with reference to FIGS. 4 through 7.

At 1115 the UE 115 may receive a message including a parameter and an MCS index based on the UE capability message. In some examples, the parameter may be a higher layer parameter. The operations of 1115 may be performed according to the methods described herein. In certain examples, aspects of the operations of 1115 may be performed by a receiver as described with reference to FIGS. 4 through 7.

At 1120 the UE 115 may select a modulation table for communicating, to a base station 105, a transmission associated with the first TTI and the second TTI based on receiving the message. The operations of 1120 may be performed according to the methods described herein. In certain examples, aspects of the operations of 1120 may be performed by a selection component as described with reference to FIGS. 4 through 7.

Figure 12:
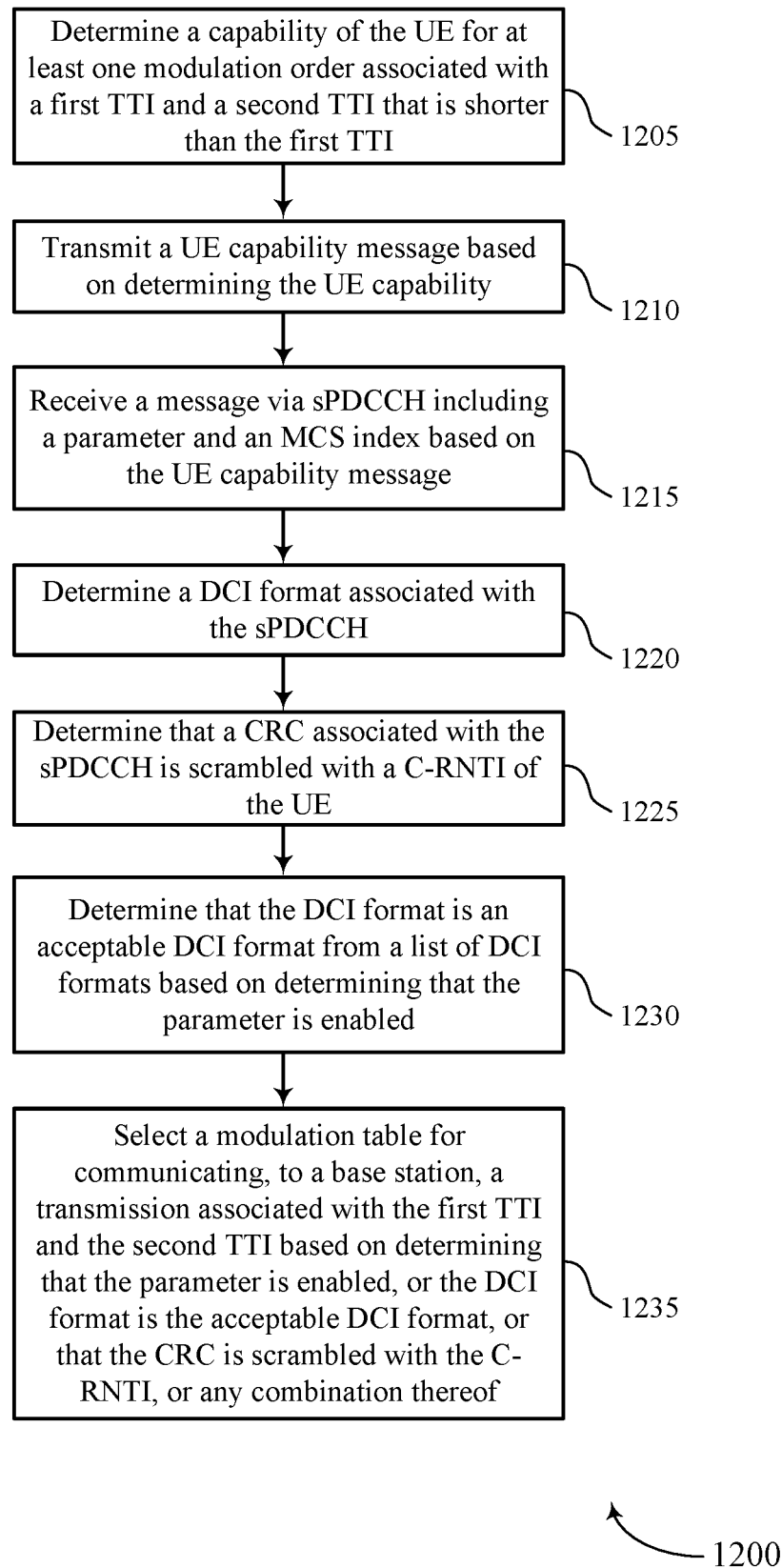

FIG. 12 shows a flowchart illustrating a method 1200 for modulation table determination and CQI reporting in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may determine a capability of the UE 115 for at least one modulation order associated with a first TTI and a second TTI that is shorter than the first TTI. The operations of 1205 may be performed according to the methods described herein. In certain examples, aspects of the operations of 1205 may be performed by a capability component as described with reference to FIGS. 4 through 7.

At 1210 the UE 115 may transmit a UE capability message based on determining the UE capability. The operations of 1210 may be performed according to the methods described herein. In certain examples, aspects of the operations of 1210 may be performed by a transmitter as described with reference to FIGS. 4 through 7.

At 1215 the UE 115 may receive a message via sPDCCH including a parameter and an MCS index based on the UE capability message. In some examples, the message further include an allocation of resources, or configuration information for one or more physical channels, or CQI reporting, or any combination thereof. The operations of 1215 may be performed according to the methods described herein. In certain examples, aspects of the operations of 1215 may be performed by a receiver as described with reference to FIGS. 4 through 7.

At 1220 the UE 115 may determine a DCI format associated with the sPDCCH. The operations of 1220 may be performed according to the methods described herein. In certain examples, aspects of the operations of 1220 may be performed by a DCI format component as described with reference to FIGS. 4 through 7.

At 1225 the UE 115 may determine that a CRC associated with the sPDCCH is scrambled with a C-RNTI of the UE 115. The operations of 1225 may be performed according to the methods described herein. In certain examples, aspects of the operations of 1225 may be performed by a CRC component as described with reference to FIGS. 4 through 7.

At 1230 the UE 115 may determine that the DCI format is an acceptable DCI format from a list of DCI formats based on determining that the parameter is enabled. The operations of 1230 may be performed according to the methods described herein. In certain examples, aspects of the operations of 1230 may be performed by a DCI format component as described with reference to FIGS. 4 through 7.

At 1235 the UE 115 may select a modulation table for communicating, to a base station 105, a transmission associated with the first TTI and the second TTI based on determining that the parameter is enabled, or the DCI format is the acceptable DCI format, or that the CRC is scrambled with the C-RNTI, or any combination thereof. The operations of 1235 may be performed according to the methods described herein. In certain examples, aspects of the operations of 1235 may be performed by a selection component as described with reference to FIGS. 4 through 7.

Figure 13:
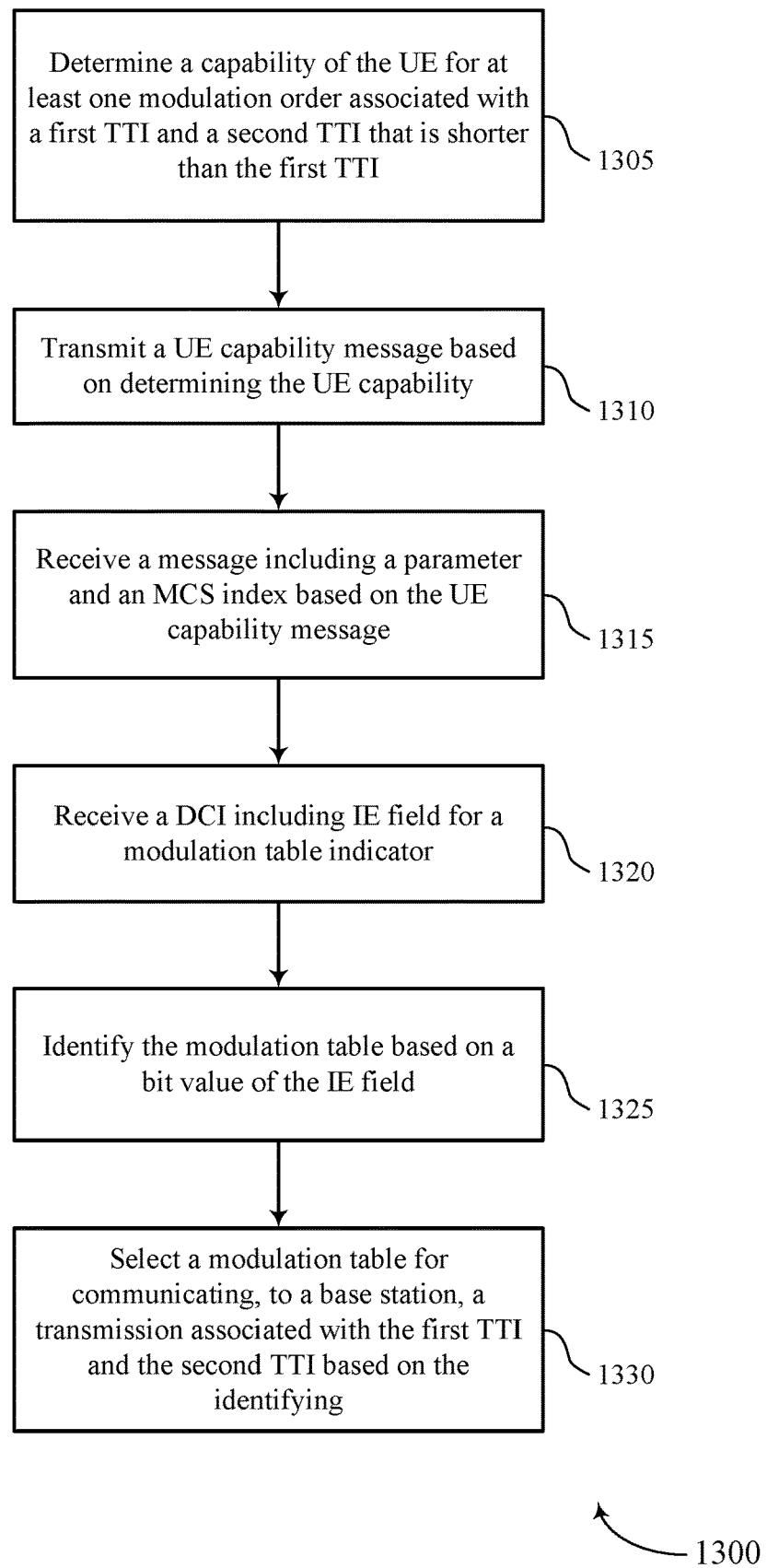

FIG. 13 shows a flowchart illustrating a method 1300 for modulation table determination and CQI reporting in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may determine a capability of the UE for at least one modulation order associated with a first TTI and a second TTI that is shorter than the first TTI. The operations of 1305 may be performed according to the methods described herein. In certain examples, aspects of the operations of 1305 may be performed by a capability component as described with reference to FIGS. 4 through 7.

At 1310 the UE 115 may transmit a UE capability message based on determining the UE capability. The operations of 1310 may be performed according to the methods described herein. In certain examples, aspects of the operations of 1310 may be performed by a transmitter as described with reference to FIGS. 4 through 7.

At 1315 the UE 115 may receive a message including a parameter and an MCS index based on the UE capability message. In some examples, the parameter may be a higher layer parameter (e.g., RRC configuration parameter). The operations of 1315 may be performed according to the methods described herein. In certain examples, aspects of the operations of 1315 may be performed by a receiver as described with reference to FIGS. 4 through 7.

At 1320 the UE 115 may receive a DCI including an IE field for a modulation table indicator. The operations of 1320 may be performed according to the methods described herein. In certain examples, aspects of the operations of 1320 may be performed by a DCI component as described with reference to FIGS. 4 through 7.

At 1325 the UE 115 may identify the modulation table based on a bit value of the IE field. The operations of 1325 may be performed according to the methods described herein. In certain examples, aspects of the operations of 1325 may be performed by a selection component as described with reference to FIGS. 4 through 7

At 1330 the UE 115 may select a modulation table for communicating, to a base station 105, a transmission associated with the first TTI and the second TTI based on the identifying. The operations of 1330 may be performed according to the methods described herein. In certain examples, aspects of the operations of 1330 may be performed by a selection component as described with reference to FIGS. 4 through 7.

Figure 14:
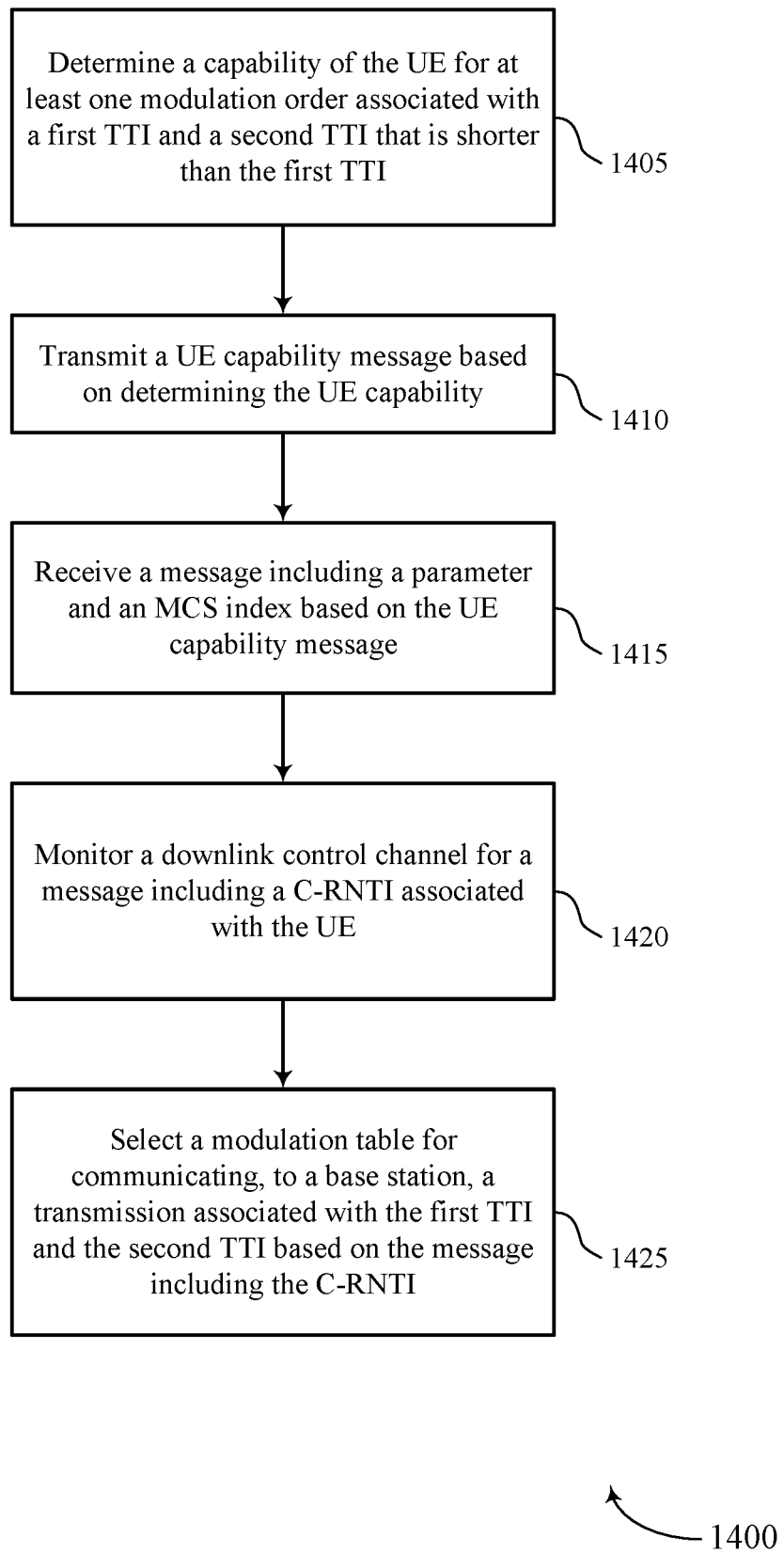

FIG. 14 shows a flowchart illustrating a method 1400 for modulation table determination and CQI reporting in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may determine a capability of the UE for at least one modulation order associated with a first TTI and a second TTI that is shorter than the first TTI. The operations of 1405 may be performed according to the methods described herein. In certain examples, aspects of the operations of 1405 may be performed by a capability component as described with reference to FIGS. 4 through 7.

At 1410 the UE 115 may transmit a UE capability message based on determining the UE capability. The operations of 1410 may be performed according to the methods described herein. In certain examples, aspects of the operations of 1410 may be performed by a transmitter as described with reference to FIGS. 4 through 7.

At 1415 the UE 115 may receive a message including a parameter and an MCS index based at least in part on the UE capability message. In some examples, the parameter may be a higher layer parameter. The operations of 1415 may be performed according to the methods described herein. In certain examples, aspects of the operations of 1415 may be performed by a receiver as described with reference to FIGS. 4 through 7.

At 1420 the UE 115 may monitor a downlink control channel for a message including a C-RNTI associated with the UE 115. The operations of 1420 may be performed according to the methods described herein. In certain examples, aspects of the operations of 1420 may be performed by a selection component as described with reference to FIGS. 4 through 7.

At 1425 the UE 115 may select a modulation table for communicating, to a base station 105, a transmission associated with the first TTI and the second TTI based on the message including the C-RNTI. The operations of 1425 may be performed according to the methods described herein. In certain examples, aspects of the operations of 1425 may be performed by a selection component as described with reference to FIGS. 4 through 7.

Figure 15:
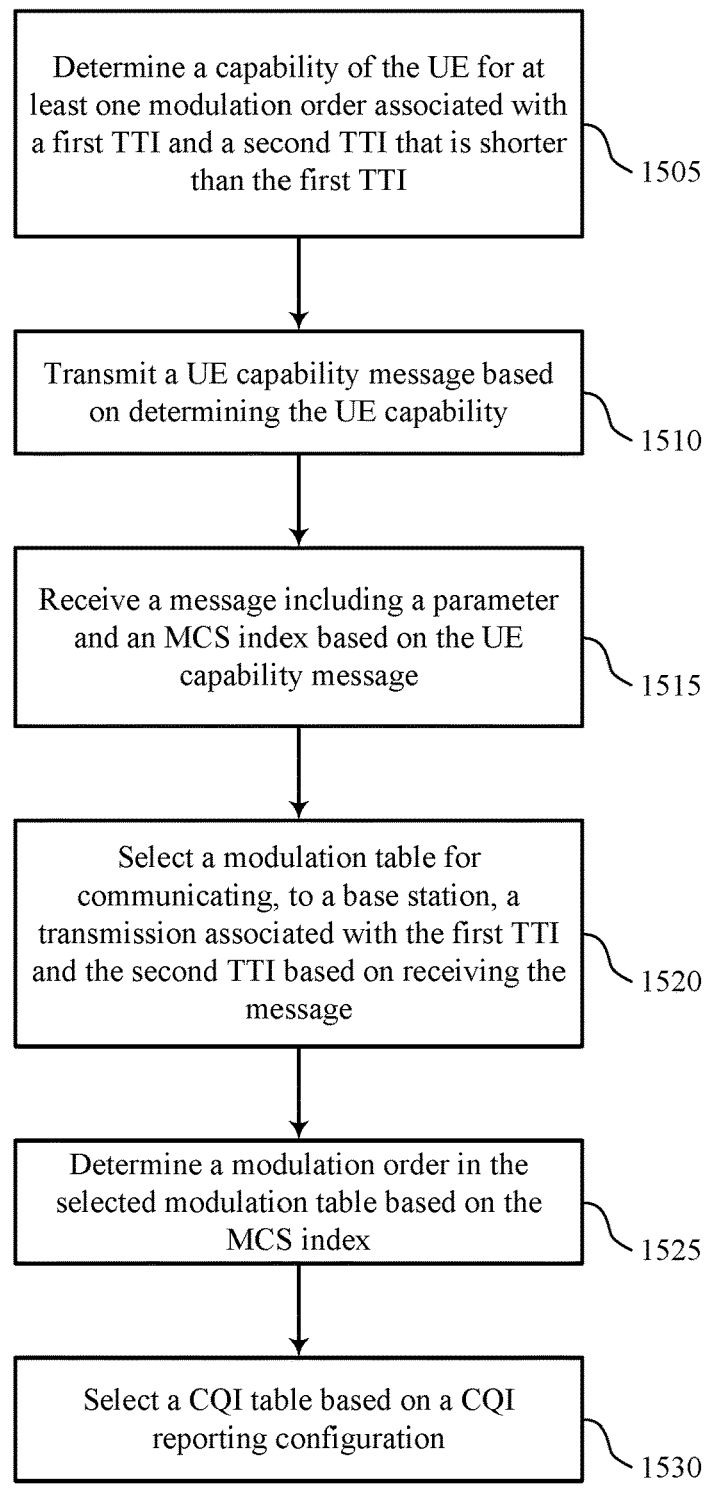

FIG. 15 shows a flowchart illustrating a method 1500 for modulation table determination and CQI reporting in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may determine a capability of the UE for at least one modulation order associated with a first TTI and a second TTI that is shorter than the first TTI. The operations of 1505 may be performed according to the methods described herein. In certain examples, aspects of the operations of 1505 may be performed by a capability component as described with reference to FIGS. 4 through 7.

At 1510 the UE 115 may transmit a UE capability message based on determining the UE capability. The operations of 1510 may be performed according to the methods described herein. In certain examples, aspects of the operations of 1510 may be performed by a transmitter as described with reference to FIGS. 4 through 7.

At 1515 the UE 115 may receive a message including a parameter and an MCS index based on the UE capability message. In some examples, the parameter may be a higher layer parameter. The operations of 1515 may be performed according to the methods described herein. In certain examples, aspects of the operations of 1515 may be performed by a receiver as described with reference to FIGS. 4 through 7.

At 1520 the UE 115 may select a modulation table for communicating, to a base station 105, a transmission associated with the first TTI and the second TTI based on receiving the message. The operations of 1520 may be performed according to the methods described herein. In certain examples, aspects of the operations of 1520 may be performed by a selection component as described with reference to FIGS. 4 through 7.

At 1525 the UE 115 may determine a modulation order in the selected modulation table based on the MCS index. The operations of 1525 may be performed according to the methods described herein. In certain examples, aspects of the operations of 1525 may be performed by a modulation order component as described with reference to FIGS. 4 through 7.

At 1530 the UE 115 may select a CQI table based on a CQI reporting configuration. The operations of 1530 may be performed according to the methods described herein. In certain examples, aspects of the operations of 1530 may be performed by a CQI component as described with reference to FIGS. 4 through 7.

Figure 16:
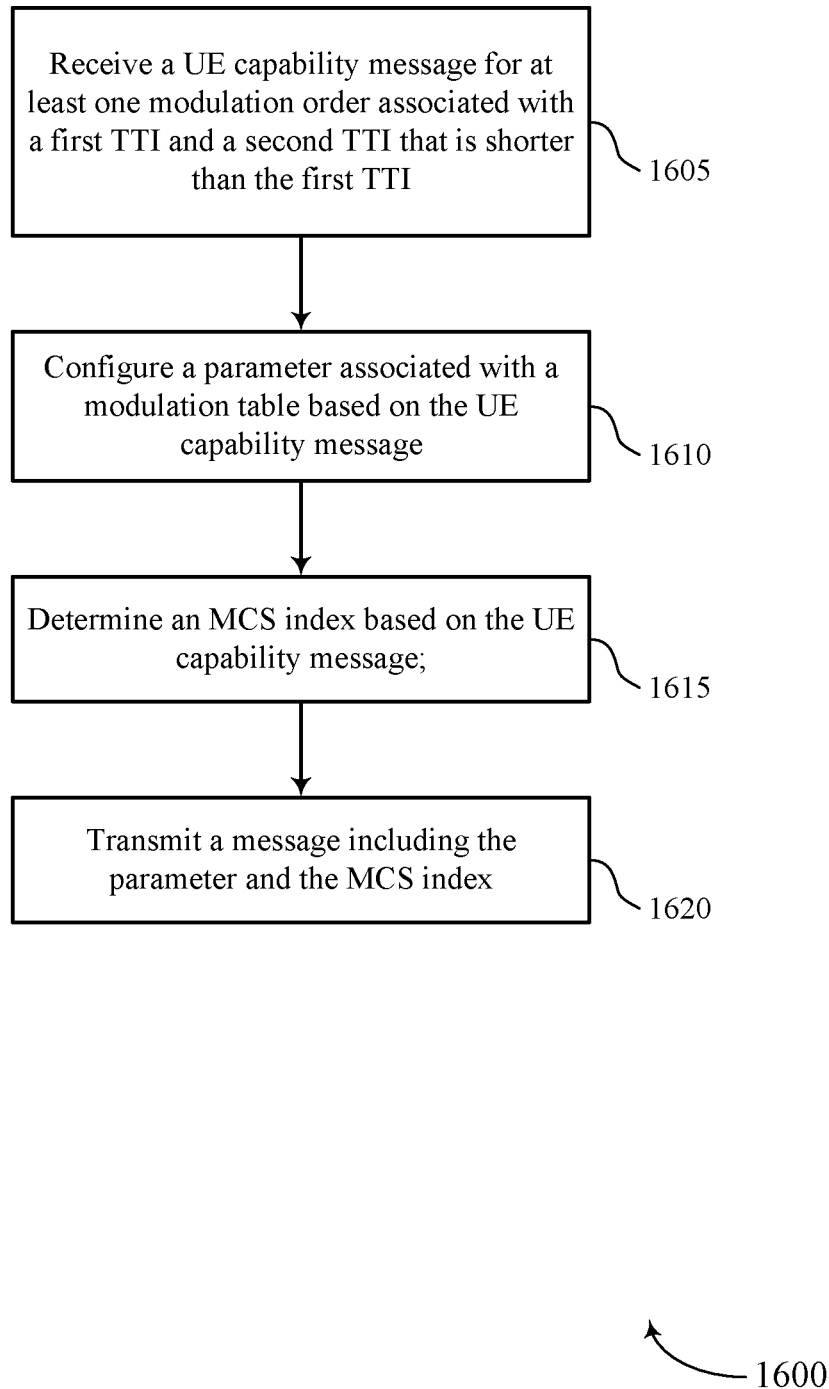

FIG. 16 shows a flowchart illustrating a method 1600 for modulation table determination and CQI reporting in accordance with aspects of the present disclosure. The operations of method 1600 may be implemented by a base station 105 or its components as described herein. For example, the operations of method 1600 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may receive a UE capability message for at least one modulation order associated with a first TTI and a second TTI that is shorter than the first TTI. The operations of 1605 may be performed according to the methods described herein. In certain examples, aspects of the operations of 1605 may be performed by a receiver as described with reference to FIGS. 8 through 10.

At 1610 the base station 105 may configure a parameter associated with a modulation table based on the UE capability message. In some examples, the parameter may be a higher layer parameter. For example, the parameter may be an RRC configuration parameter. The operations of 1610 may be performed according to the methods described herein. In certain examples, aspects of the operations of 1610 may be performed by a configuration component as described with reference to FIGS. 8 through 10.

At 1615 the base station 105 may determine an MCS index based on the UE capability message. The operations of 1615 may be performed according to the methods described herein. In certain examples, aspects of the operations of 1615 may be performed by an MCS component as described with reference to FIGS. 8 through 10.

At 1620 the base station 105 may transmit a message including the parameter and the MCS index. The operations of 1620 may be performed according to the methods described herein. In certain examples, aspects of the operations of 1620 may be performed by a transmitter as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting a user equipment (UE) capability message comprising a first capability indication for at least one modulation order associated with a first transmission time interval (TTI) and a second capability indication for at least one modulation order associated with a second TTI that is shorter than the first TTI;
   receiving a configuration message comprising a parameter based at least in part on the UE capability message, wherein the parameter is associated with channel quality indicator (CQI) reporting for the second TTI; and
   selecting a modulation table for a transmission associated with the second TTI based at least in part on the configuration message.

2. The method of claim 1, further comprising:
   determining whether the parameter is enabled or disabled, wherein selecting the modulation table is based at least in part on determining whether the parameter is enabled.

3. The method of claim 1, further comprising:
   receiving the configuration message via a shortened physical downlink control channel (sPDCCH), wherein the configuration message further comprises an allocation of resources, or configuration information for one or more physical channels, or any combination thereof, wherein the configuration information comprises a transmission configuration for the first TTI and the second TTI, and the CQI reporting is based at least in part on the configuration information.

4. The method of claim 3, further comprising:
   determining a downlink control information (DCI) format associated with the sPDCCH; and
   determining that a cyclic redundancy check (CRC) associated with the sPDCCH is scrambled with a cell radio network temporary identifier (C-RNTI) of the UE.

5. The method of claim 4, further comprising:
   determining that the DCI format is an acceptable DCI format from a list of DCI formats based at least in part on determining that the parameter is enabled;
   determining that the CRC is scrambled with the C-RNTI of the UE; and
   determining a modulation order in the modulation table based at least in part on a modulation coding scheme (MCS) index, wherein selecting the modulation table is based at least in part on determining that the parameter is enabled, or the DCI format is the acceptable DCI format, or that the CRC is scrambled with the C-RNTI, or any combination thereof.

6. The method of claim 3, further comprising:
   determining a modulation order in the selected modulation table based at least in part on a modulation coding scheme (MCS) index, wherein selecting the modulation table is based at least in part on determining that the parameter is disabled.

7. The method of claim 1, wherein the second TTI is a shortened TTI (sTTI).

8. The method of claim 1, further comprising:
   transmitting a second UE capability message separate from the UE capability message indicating capability of the UE for the second TTI.

9. The method of claim 1, wherein the UE capability message comprises UE capability for both the first TTI and the second TTI.

10. The method of claim 1, wherein the second TTI comprises a plurality of shortened TTIs (sTTIs), and wherein the UE capability message is associated with the plurality of sTTIs.

11. The method of claim 10, further comprising:
    transmitting a UE capability message for at least some sTTIs of the plurality of sTTIs, wherein the parameter and a modulation coding scheme (MCS) index is associated with the plurality of sTTIs or each sTTI is associated with a separate parameter and MCS index.

12. The method of claim 10, wherein at least a subset of the sTTIs comprise variable lengths.

13. The method of claim 1, wherein the UE is configured with a default modulation table for the transmission associated with the first TTI and the second TTI.

14. The method of claim 1, further comprising:
receiving a downlink control information (DCI) comprising an information element (IE) field for a modulation table indicator; and
identifying the modulation table based at least in part on a bit value of the IE field, wherein selecting the modulation table is based at least in part on the identifying.

15. The method of claim 1, further comprising:
monitoring a downlink control channel for a message comprising a C-RNTI associated with the UE, wherein selecting the modulation table is further based at least in part on the message comprising the C-RNTI.

16. The method of claim 1, further comprising:
determining a modulation order in the selected modulation table based at least in part on a modulation coding scheme (MCS) index; and
selecting a channel quality indicator (CQI) table based at least in part on a CQI reporting configuration,
wherein the CQI reporting configuration associated with CQI reporting indicates that the CQI table applies to the first TTI or the second TTI, or both.

17. The method of claim 1, wherein the second capability indication comprises an indication of UE capability for a 64QAM, a 256QAM, or a 1024QAM.

18. The method of claim 1, wherein the transmission is a downlink transmission or an uplink transmission.

19. The method of claim 18, further comprising:
selecting the modulation table for the uplink transmission based at least in part on a modulation coding scheme (MCS) index; and
determining a modulation order in the selected modulation table for the uplink transmission based at least in part on the MCS index and a downlink control information (DCI) format associated with the received configuration message.

20. The method of claim 1, further comprising:
determining the modulation order for the uplink transmission based at least in part on semi-persistent scheduling or a random access response grant.

21. The method of claim 1, wherein the parameter is a higher layer parameter.

22. The method of claim 1, further comprising:
transmitting a second UE capability message separate from the UE capability message,
wherein the UE capability message is for uplink and the second UE capability message is for downlink.

23. The method of claim 1, further comprising:
receiving downlink control information (DCI) having a DCI format for scheduling the transmission associated with the second TTI, wherein selecting the modulation table is based at least in part on the DCI having the DCI format.

24. A method for wireless communication, comprising:
receiving a user equipment (UE) capability message comprising a first capability indication for at least one modulation order associated with a first transmission time interval (TTI) and a second capability indication for at least one modulation order associated with a second TTI that is shorter than the first TTI;
configuring a parameter associated with a modulation table and channel quality indicator (CQI) reporting for the second TTI based at least in part on the UE capability message;
transmitting a configuration message comprising the parameter.

25. The method of claim 24, further comprising:
enabling the parameter based at least in part on the UE capability message, wherein configuring the parameter comprises the enabling.

26. The method of claim 24, further comprising:
disabling the parameter based at least in part on the UE capability message, wherein configuring the parameter comprises the disabling.

27. The method of claim 24, further comprising:
transmitting the configuration message via a shortened physical downlink control channel (sPDCCH), wherein the configuration message further comprises an allocation of resources, or configuration information for one or more physical channels, or any combination thereof,
wherein the configuration information comprises a transmission configuration for the first TTI and a second TTI, and the CQI reporting is based at least in part on the configuration information.

28. The method of claim 24, further comprising:
receiving a second UE capability information message separate from the UE capability message indicating capability for the second TTI.

29. An apparatus for wireless communication, comprising:
a processor;
memory in electronic communication with the processor; and
instructions stored in the memory and executable by the processor to cause the apparatus to:
transmit a user equipment (UE) capability message comprising a first capability indication for at least one modulation order associated with a first transmission time interval (TTI) and a second capability indication for at least one modulation order associated with a second TTI that is shorter than the first TTI;
receive a configuration message comprising a parameter based at least in part on the UE capability message, wherein the parameter is associated with channel quality indicator (CQI) reporting for the second TTI; and
select a modulation table for communicating, to a base station, a transmission associated with the first TTI and the second TTI based at least in part on receiving the message.

30. An apparatus for wireless communication, comprising:
a processor;
memory in electronic communication with the processor; and
instructions stored in the memory and executable by the processor to cause the apparatus to:
receive a user equipment (UE) capability message comprising a first capability indication for at least one modulation order associated with a first transmission time interval (TTI) and a second capability indication for at least one modulation order associated with a second TTI that is shorter than the first TTI;

configure a parameter associated with a modulation table and channel quality indicator (CQI) reporting for the second TTI based at least in part on the UE capability message; and
transmit a configuration message comprising the parameter.

* * * * *